United States Patent
Zhang et al.

(10) Patent No.: US 11,871,357 B2
(45) Date of Patent: **\*Jan. 9, 2024**

(54) APPARATUS AND METHOD IN WIRELESS COMMUNICATION SYSTEM, AND COMPUTER READABLE STORAGE MEDIUM

(71) Applicant: Sony Group Corporation, Tokyo (JP)

(72) Inventors: Wenbo Zhang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,359

(22) Filed: Jan. 5, 2023

(65) Prior Publication Data

US 2023/0156617 A1     May 18, 2023

Related U.S. Application Data

(63) Continuation of application No. 17/384,822, filed on Jul. 26, 2021, now abandoned, which is a
(Continued)

(30) Foreign Application Priority Data

Feb. 2, 2018   (CN) .......................... 201810106743.5

(51) Int. Cl.
    *H04W 24/10*     (2009.01)
    *H04W 52/24*     (2009.01)
    (Continued)

(52) U.S. Cl.
    CPC ......... *H04W 52/242* (2013.01); *H04L 5/0023* (2013.01); *H04L 5/0048* (2013.01);
    (Continued)

(58) Field of Classification Search
    CPC . H04W 52/242; H04W 52/146; H04W 72/20; H04W 24/10; H04L 5/0023; H04L 5/0048; H04L 5/0057
    See application file for complete search history.

(56) References Cited

U.S. PATENT DOCUMENTS 7,246,045 B1   7/2007   Rappaport et al.
7,286,971 B2   10/2007  Rappaport et al.
(Continued)

FOREIGN PATENT DOCUMENTS

CN   101272173 A   9/2008
CN   101883415 A   11/2010
(Continued)

OTHER PUBLICATIONS

International Search Report and Written Opinion dated Apr. 18, 2019 for PCT/CN2019/073347 filed on Jan. 28, 2019, 8 pages.

*Primary Examiner* — Hai V Nguyen
(74) *Attorney, Agent, or Firm* — XSENSUS LLP

(57) ABSTRACT

Provided are a device and method for a wireless communication system, and a computer readable storage medium. The device comprises a processing circuit. The processing circuit is configured to: acquire the current three-dimensional spatial location of a user equipment, and determine a resource for the user equipment according to information showing a mapping relationship at least between three-dimensional spatial regions and resources. According to an aspect of the embodiment of the present disclosure, time delay can be decreased and transmission performance can be optimized by pre-establishing a mapping relationship between three-dimensional spatial regions and resources and assigning to the user equipment an uplink/downlink time-frequency resource on the basis of the mapping relationship.

11 Claims, 17 Drawing Sheets

Related U.S. Application Data continuation of application No. 16/966,481, filed as application No. PCT/CN2019/073347 on Jan. 28, 2019, now Pat. No. 11,102,728.

(51) Int. Cl.
*H04L 5/00* (2006.01)
*H04W 52/14* (2009.01)
*H04W 72/20* (2023.01)

(52) U.S. Cl.
CPC ........... *H04L 5/0057* (2013.01); *H04W 24/10* (2013.01); *H04W 52/146* (2013.01); *H04W 72/20* (2023.01)

(56) References Cited

U.S. PATENT DOCUMENTS

| | | | |
|---|---|---|---|
| 7,399,279 B2 | 7/2008 | Abend et al. | |
| 7,953,166 B2* | 5/2011 | Grob-Lipski | H04L 5/006 375/267 |
| 8,364,141 B1 | 1/2013 | Kateley et al. | |
| 8,477,751 B2 | 7/2013 | Nakaya et al. | |
| 8,570,650 B2 | 10/2013 | Dougherty et al. | |
| 9,042,932 B2* | 5/2015 | Gao | H04W 52/242 455/69 |
| 9,414,325 B2* | 8/2016 | Zhang | H04W 52/242 |
| 9,520,973 B2 | 12/2016 | Kim et al. | |
| 9,537,561 B1* | 1/2017 | Kotecha | H04W 8/00 |
| 9,681,341 B2* | 6/2017 | Ryu | H04W 36/00837 |
| 9,704,270 B1* | 7/2017 | Main | G06T 15/60 |
| 9,798,329 B2* | 10/2017 | Shattil | H04W 4/40 |
| 10,062,181 B1* | 8/2018 | Longhurst | G06T 7/13 |
| 10,086,954 B2 | 10/2018 | Zhong et al. | |
| 10,136,456 B2 | 11/2018 | Song et al. | |
| 10,148,332 B2 | 12/2018 | Stirling-Gallacher et al. | |
| 10,244,539 B2* | 3/2019 | Jin | H04W 52/244 |
| 10,282,898 B1* | 5/2019 | Kuntsevich | G06T 17/20 |
| 10,312,993 B2* | 6/2019 | Rupasinghe | H04B 7/0452 |
| 10,348,394 B1* | 7/2019 | Bakr | H04L 5/14 |
| 10,367,620 B2 | 7/2019 | Iyer et al. | |
| 10,390,382 B2 | 8/2019 | Mueck et al. | |
| 10,397,904 B2* | 8/2019 | Islam | H04W 72/23 |
| 10,431,103 B2* | 10/2019 | Murphy | G08G 5/0034 |
| 10,444,766 B2* | 10/2019 | Shattil | G05D 1/0088 |
| 10,453,347 B2* | 10/2019 | Winkler | H04W 4/024 |
| 10,484,839 B2 | 11/2019 | Cui et al. | |
| 10,638,334 B2 | 4/2020 | Zhang et al. | |
| 10,638,361 B2 | 4/2020 | Gunasekara et al. | |
| 10,650,621 B1 | 5/2020 | King et al. | |
| 10,776,939 B2 | 9/2020 | Ma et al. | |
| 10,866,596 B1* | 12/2020 | Shattil | B64C 39/024 |
| 10,868,653 B2 | 12/2020 | Iyer et al. | |
| 10,880,840 B1 | 12/2020 | Mansour et al. | |
| 10,880,939 B2 | 12/2020 | Mueck et al. | |
| 10,908,771 B2 | 2/2021 | Berquam et al. | |
| 10,945,171 B2* | 3/2021 | Kalathil | G05D 1/0022 |
| 10,945,214 B2* | 3/2021 | Chen | H04W 52/146 |
| 10,979,120 B2* | 4/2021 | Sethuraman | H04B 7/0413 |
| 11,074,746 B2* | 7/2021 | You | G08G 5/0026 |
| 11,102,728 B2* | 8/2021 | Zhang | H04W 24/10 |
| 11,137,755 B2* | 10/2021 | Phuyal | H04W 76/32 |
| 11,196,475 B2* | 12/2021 | Nilsson | H04W 24/10 |
| 11,240,810 B2* | 2/2022 | Kim | H04W 48/16 |
| 11,265,126 B2* | 3/2022 | Nyström | H04L 5/0048 |
| 11,284,379 B2* | 3/2022 | Islam | H04W 72/23 |
| 11,290,159 B2* | 3/2022 | Liu | H04B 7/0417 |
| 11,374,614 B1 | 6/2022 | Mukherjee | H04W 72/541 |
| 11,381,988 B2* | 7/2022 | Zhang | H04W 72/0453 |
| 11,416,009 B2* | 8/2022 | Zhang | H04W 4/025 |
| 11,425,586 B2* | 8/2022 | Lu | H04W 24/08 |
| 11,564,149 B2* | 1/2023 | Vivanco | H04W 36/32 |
| 11,586,227 B2* | 2/2023 | Shattil | B64C 39/024 |
| 2005/0043933 A1 | 2/2005 | Rappaport et al. | |
| 2006/0039274 A1* | 2/2006 | Park | H04W 72/23 370/208 |
| 2007/0263580 A1* | 11/2007 | Grob-Lipski | H04W 16/04 370/338 |
| 2011/0053647 A1* | 3/2011 | Oyama | H04W 16/28 455/562.1 |
| 2011/0194175 A1 | 8/2011 | Dougherty et al. | |
| 2011/0254736 A1* | 10/2011 | Thomas | H04B 17/10 342/417 |
| 2012/0134336 A1 | 5/2012 | Nakaya et al. | |
| 2013/0039342 A1* | 2/2013 | Kazmi | H04W 48/16 370/329 |
| 2014/0003240 A1 | 1/2014 | Chen et al. | |
| 2014/0078973 A1* | 3/2014 | Kazmi | H04W 24/02 370/329 |
| 2014/0087782 A1 | 3/2014 | Zhang et al. | |
| 2014/0092771 A1* | 4/2014 | Siomina | H04W 24/08 370/252 |
| 2014/0177683 A1* | 6/2014 | Krishnamurthy | H04B 7/0478 375/219 |
| 2014/0177744 A1* | 6/2014 | Krishnamurthy | H04B 7/065 375/267 |
| 2014/0177745 A1* | 6/2014 | Krishnamurthy | H04B 7/063 375/267 |
| 2014/0347223 A1 | 11/2014 | Hyde et al. | |
| 2015/0373593 A1 | 12/2015 | Ryu et al. | |
| 2015/0382205 A1 | 12/2015 | Lee et al. | |
| 2016/0117853 A1 | 4/2016 | Zhong et al. | |
| 2016/0192157 A1 | 6/2016 | Wirola et al. | |
| 2016/0242063 A1* | 8/2016 | Tercero Vargas | H04W 16/14 |
| 2016/0330771 A1* | 11/2016 | Tan | H04B 7/18506 |
| 2016/0337881 A1 | 11/2016 | Zhang et al. | |
| 2016/0353424 A1 | 12/2016 | Stirling-Gallacher et al. | |
| 2017/0126309 A1* | 5/2017 | Rupasinghe | H04B 7/024 |
| 2017/0134913 A1 | 5/2017 | Cui et al. | |
| 2017/0135099 A1 | 5/2017 | Song et al. | |
| 2017/0366311 A1* | 12/2017 | Iyer | H04L 5/0007 |
| 2018/0039287 A1* | 2/2018 | Shattil | H04B 7/18504 |
| 2018/0061123 A1 | 3/2018 | Owechko | |
| 2018/0192449 A1 | 7/2018 | Mueck et al. | |
| 2018/0211441 A1 | 7/2018 | Priest et al. | |
| 2018/0293897 A1* | 10/2018 | Murphy | H04W 24/02 |
| 2018/0315323 A1* | 11/2018 | Winkler | G08G 5/0095 |
| 2018/0324580 A1* | 11/2018 | Phuyal | H04W 8/24 |
| 2018/0324581 A1* | 11/2018 | Phuyal | H04B 7/18504 |
| 2018/0324662 A1* | 11/2018 | Phuyal | H04B 7/15507 |
| 2018/0324762 A1* | 11/2018 | Zhu | H04W 72/04 |
| 2018/0337725 A1 | 11/2018 | Stephenne et al. | |
| 2018/0352473 A1 | 12/2018 | Gunasekara et al. | |
| 2019/0045406 A1* | 2/2019 | Kalathil | G05D 1/102 |
| 2019/0081753 A1* | 3/2019 | Jung | H04W 56/001 |
| 2019/0104477 A1* | 4/2019 | MolavianJazi | H04W 72/23 |
| 2019/0123864 A1* | 4/2019 | Zhang | H04W 16/28 |
| 2019/0132850 A1* | 5/2019 | Sun | H04W 74/004 |
| 2019/0159136 A1* | 5/2019 | MolavianJazi | H04W 52/362 |
| 2019/0180501 A1* | 6/2019 | You | G08G 5/0013 |
| 2019/0212724 A1* | 7/2019 | Phuyal | H04W 84/042 |
| 2019/0245631 A1* | 8/2019 | Kim | H04B 15/04 |
| 2019/0260459 A1* | 8/2019 | Jeon | H04B 7/04 |
| 2019/0288809 A1 | 9/2019 | Iyer et al. | |
| 2019/0304120 A1 | 10/2019 | Ma et al. | |
| 2019/0306675 A1* | 10/2019 | Xue | H04B 17/345 |
| 2019/0342879 A1* | 11/2019 | Islam | H04L 5/0053 |
| 2019/0369641 A1 | 12/2019 | Gillett | |
| 2019/0373618 A1 | 12/2019 | Medina et al. | |
| 2019/0387562 A1 | 12/2019 | Mueck et al. | |
| 2019/0393951 A1* | 12/2019 | Hardy | G01S 5/04 |
| 2020/0064444 A1* | 2/2020 | Regani | G01S 7/417 |
| 2020/0084735 A1 | 3/2020 | Cheng et al. | |
| 2020/0225673 A1* | 7/2020 | Ebrahimi Afrouzi | G05D 1/0044 |
| 2020/0245174 A1* | 7/2020 | Lu | H04W 24/10 |
| 2020/0245175 A1* | 7/2020 | Zhang | H04W 74/08 |
| 2020/0249819 A1 | 8/2020 | Berquam et al. | |
| 2020/0264636 A1* | 8/2020 | Zhang | G08G 5/0013 |
| 2020/0322913 A1* | 10/2020 | Jiang | G01S 5/10 |
| 2020/0329398 A1 | 10/2020 | Gunasekara et al. | |
| 2020/0344643 A1 | 10/2020 | Zhou et al. | |
| 2020/0374891 A1 | 11/2020 | Medina et al. | |
| 2020/0396422 A1 | 12/2020 | Terry et al. | |

(56) References Cited

U.S. PATENT DOCUMENTS

| | | | |
|---|---|---|---|
| 2020/0402318 A1 | 12/2020 | Terry et al. | |
| 2020/0404175 A1 | 12/2020 | Terry et al. | |
| 2021/0028832 A1* | 1/2021 | Liu | H04W 16/28 |
| 2021/0045067 A1* | 2/2021 | Zhang | H04W 24/10 |
| 2021/0068078 A1 | 3/2021 | Medina et al. | |
| 2021/0352593 A1* | 11/2021 | Zhang | H04L 5/0023 |
| 2021/0353244 A1* | 11/2021 | Kiely | A61N 5/1068 |
| 2021/0373552 A1* | 12/2021 | Bhuyan | H04W 4/70 |
| 2021/0373581 A1* | 12/2021 | Shattil | G05D 1/104 |
| 2022/0182203 A1* | 6/2022 | Nyström | H04L 5/006 |
| 2022/0283595 A1* | 9/2022 | Zhang | G05D 1/106 |
| 2022/0353724 A1* | 11/2022 | Lu | H04W 24/10 |

FOREIGN PATENT DOCUMENTS

| | | | | |
|---|---|---|---|---|
| CN | 102811478 A | 12/2012 | | |
| CN | 106465174 A | 2/2017 | | |
| EP | 1855434 B1 * | 10/2010 | | H04L 5/0032 |
| EP | 2982049 B1 * | 6/2022 | | H04B 7/0456 |
| WO | 2017/067675 A1 | 4/2017 | | |
| WO | 2019/037864 A1 | 2/2019 | | |
| WO | 2019/114924 A1 | 6/2019 | | |

* cited by examiner

APPARATUS AND METHOD IN WIRELESS COMMUNICATION SYSTEM, AND COMPUTER READABLE STORAGE MEDIUM

CROSS-REFERENCE TO RELATED APPLICATIONS

The present application is a continuation of U.S. patent application Ser. No. 17/384,822, filed Jul. 26, 2021, which is a continuation of U.S. patent application Ser. No. 16/966, 481, filed Jul. 31, 2020 (now U.S. Pat. No. 11,102,728), which is based on PCT filing PCT/CN2019/073347, filed Jan. 28, 2019, which claims priority to Chinese Patent Application No. 201810106743.5, filed Feb. 2, 2018 with the Chinese Patent Office, each of which is incorporated herein by reference in its entirety.

FIELD

The present disclosure relates to the technical field of wireless communications, and in particular to an apparatus and a method in one or more wireless communication systems capable of effectively performing uplink/downlink resource allocation, beam adjustment, and uplink power control in unmanned aerial vehicle (UAV) communication, and a computer readable storage medium.

BACKGROUND

Currently, the industry is increasingly interested in utilizing unmanned aerial vehicles (which are also referred to as drones) in cellular networks. Commercial applications of unmanned aerial vehicles increase rapidly. Application scenarios such as searching and rescuing, critical infrastructure monitoring, wildlife protection, flight cameras, surveillance will increase rapidly in the coming years. A distribution of an existing LTE network serves unmanned aerial vehicles very well. Therefore, if unmanned aerial vehicles are connected to the existing LTE network, applications of unmanned aerial vehicles in these scenarios can be significantly enhanced.

However, the unmanned aerial vehicle is different from common user equipment (UE) on the ground. For example, the unmanned aerial vehicle has a higher-flying height and a larger flying speed than the common UE on the ground, a channel condition between an unmanned aerial vehicle that operates and a base station is usually based on a line-of-sight (LoS), and the like. Therefore, it is urgent to enhance unmanned aerial vehicle communication based on LTE.

SUMMARY

A brief summary of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

In view of this, an object of at least one aspect of the present disclosure is to provide a solution capable of effectively performing uplink/downlink resource allocation in unmanned aerial vehicle communication.

An object of another aspect of the present disclosure is to provide a solution that a base station assists an unmanned aerial vehicle in adjusting an uplink beam so as to optimize transmission performance.

An object of another aspect of the present disclosure is to provide an uplink power control solution that is more suitable for unmanned aerial vehicle communication.

According to an aspect of the present disclosure, an apparatus in a wireless communication system is provided. The apparatus includes processing circuitry. The processing circuitry is configured to: acquire a current three-dimensional spatial location of user equipment; and determine a resource for the user equipment according to information indicating at least mapping relationship between three-dimensional spatial regions and resources.

According to another aspect of the present disclosure, an apparatus in a wireless communication system is further provided. The apparatus includes processing circuitry. The processing circuitry is configured to: control user equipment to report a current three-dimensional spatial location to a base station; and control, based on a resource which is determined by the base station according to the current three-dimensional spatial location and information indicating at least mapping relationship between three-dimensional spatial regions and resources, the user equipment to perform communication operations.

According to another aspect of the present disclosure, an apparatus in a wireless communication system is further provided. The apparatus includes processing circuitry. The processing circuitry is configured to: allocate a predetermined number of resources for each three-dimensional spatial region; and establish, according to a channel quality obtained based on each of the predetermined number of resources, mapping relationship between three-dimensional spatial regions and resources.

According to another aspect of the present disclosure, an apparatus in a wireless communication system is further provided. The apparatus includes processing circuitry. The processing circuitry is configured to control, based on a predetermined number of resources allocated by a base station for each three-dimensional spatial region, user equipment to transmit to the base station a channel quality measurement result and/or an uplink reference signal, for the base station to establish mapping relationship between three-dimensional spatial regions and resources According to another aspect of the present disclosure, an apparatus in a wireless communication system is further provided. The apparatus includes processing circuitry. The processing circuitry is configured to: determine, based on a measurement result of a downlink channel quality or an uplink channel quality between a base station and user equipment, information related to an uplink transmission angle of the user equipment; and control the base station to notify the user equipment of the determined information related to the uplink transmission angle, for the user equipment to perform uplink transmission based on the uplink transmission angle.

According to another aspect of the present disclosure, an apparatus in a wireless communication system is further provided. The apparatus includes processing circuitry. The processing circuitry is configured to: determine an uplink transmission angle according to information related to the uplink transmission angle from a base station; and control, based on the uplink transmission angle, user equipment to perform uplink transmission with respect to the base station.

According to another aspect of the present disclosure, an apparatus in a wireless communication system is further provided. The apparatus includes processing circuitry. The processing circuitry is configured to: determine, based on a measurement result for an uplink reference signal from user equipment, an uplink path loss compensation factor specific to the user equipment from a predetermined path loss compensation factor set, and/or an uplink power correction value specific to the user equipment from a predetermined power correction value set; and control a base station to notify the user equipment of the determined uplink path loss compensation factor and/or uplink power correction value.

According to another aspect of the present disclosure, an apparatus in a wireless communication system is further provided. The apparatus includes processing circuitry. The processing circuitry is configured to: control user equipment to transmit an uplink reference signal to a base station; and control, based on an uplink path loss compensation factor and/or an uplink power correction value specific to the user equipment notified by the base station, the user equipment to perform uplink data transmission or transmit the uplink reference signal with respect to the base station. The uplink path loss compensation factor and the uplink power correction value are respectively determined from a predetermined path loss compensation factor set and a predetermined power correction value set by the base station based on a measurement result for the uplink reference signal.

According to another aspect of the present disclosure, a method in a wireless communication system corresponding to the apparatus in a wireless communication system is further provided. The method may be performed by the processing circuitry in the corresponding apparatus.

According to other aspects of the present disclosure, there are further provided a computer readable storage medium having recorded thereon executable instructions for performing the method according to the present disclosure, a computer program code and a computer program product for performing the method according to the present disclosure.

According to an aspect of embodiments of the present disclosure, through allocating an appropriate uplink/downlink time-frequency resource to an unmanned aerial vehicle according to a current three-dimensional spatial location of the unmanned aerial vehicle and a pre-established mapping relationship between three-dimensional spatial regions and time-frequency resources, processing overhead and delay caused by processes such as measurement in resource allocation can be reduced compared with resource allocation solution in the conventional LTE communication system.

According to another aspect of the embodiments of the present disclosure, a solution for establishing a mapping relationship between uplink/downlink resources and three-dimensional spatial regions is provided, so that a base station allocates an appropriate uplink/downlink resource to the unmanned aerial vehicle based on the mapping relationship, so as to reduce processing overhead and delay in resource allocation.

According to another aspect of the embodiments of the present disclosure, through assisting, by the base station, the unmanned aerial vehicle in adjusting an uplink transmission angle, uplink transmission quality can be optimized without increasing energy consumption and processing overhead of the unmanned aerial vehicle.

According to another aspect of the embodiments of the present disclosure, for characteristics that the unmanned aerial vehicle generally has a high flying height and a large flying speed, and has a channel condition different from that of the conventional user equipment on the ground, through providing the unmanned aerial vehicle with a path loss compensation factor set and/or an uplink power correction value set different from that applied in the conventional uplink power control, uplink power control for unmanned aerial vehicle communication can be optimized.

Other aspects of the embodiments of the present disclosure are given in the following description, in which preferred embodiments for fully disclosing the embodiments of the present disclosure are described in detail without placing a restriction thereon.

BRIEF DESCRIPTION OF THE DRAWINGS

The present disclosure is better understood by the detailed description given below in conjunction with the accompanying drawings. In the drawings, same or similar reference numerals are utilized to refer to same or similar components. The drawings together with the following detailed description are incorporated in and form a part of this specification to further illustrate preferred embodiments of the present disclosure and explain principles and advantages of the present disclosure. In the drawings.

DETAILED DESCRIPTION OF EMBODIMENTS

Figure 1:
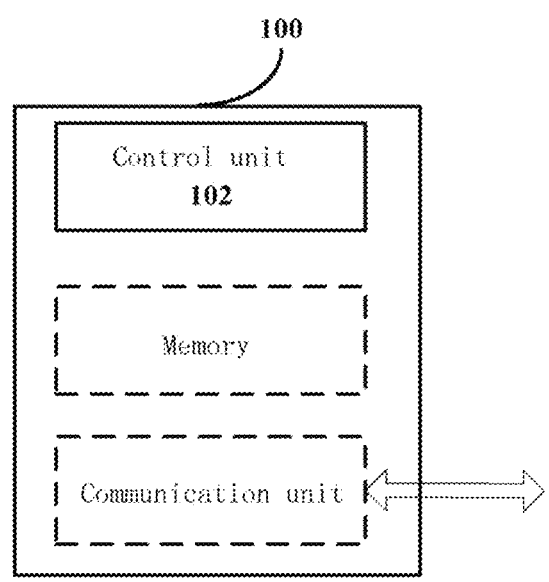
FIG. 1 is a block diagram showing an example of functional configuration of an apparatus on a base station side in a wireless communication system according to a first embodiment of the present disclosure.

Exemplary embodiments of the present disclosure are described below with reference to the drawings. For clarity and conciseness, not all characteristics of an actual embodiment are described in the specification. However, it should be understood that many embodiment-specific decisions, for example, conforming to restrictions related to system and business, must be made when developing any actual embodiment, so as to achieve a specific goal of a developer. These restrictions may vary depending on embodiments. In addition, it should be understood that, although development work may be complex and time-consuming, the development work is merely a routine task for those skilled in the art who benefit from the present disclosure.

Here, it should be further noted that, in order to avoid obscuring the present disclosure due to unnecessary details, the drawings show only device structures and/or processing steps that are closely related to technical solutions of the present disclosure, and other details have little relevance to the present disclosure are omitted.

Hereinafter, preferred embodiments of the present disclosure are described in detail with reference to FIGS. 1 to 28. Hereinafter, preferred embodiments of the present disclosure are described in the following order. However, it should be noted that although the embodiments of the present disclosure are described in the following order of chapters for the convenience of description, this division and order of chapters does not constitute a limitation on the present disclosure. On the contrary, when actually implementing the technology according to the present disclosure, those skilled in the art may combine the following embodiments based on the principles of the present disclosure and actual conditions, unless these embodiments conflict with each other.

1. First Embodiment (Establishment of mapping relationship between three-dimensional spatial regions and resources)
    1-1. Configuration example on a base station side
        1-1-1. Establishment of a mapping relationship between three-dimensional spatial regions and downlink resources
        1-1-2. Establishment of a mapping relationship between three-dimensional spatial regions and uplink resources
    1-2. Configuration example on a user equipment side
2. Second Embodiment (Resource allocation and transmission control based on mapping relationship)
    2-1. Configuration example on a base station side
    2-2. Configuration example on a user equipment side
3. Third Embodiment (Base station-assisted uplink transmission angle adjustment)
    3-1. Configuration example on a base station side
        3-1-1. Determination of an uplink transmission angle based on a measurement result of downlink channel quality
        3-1-2. Determination of an uplink transmission angle based on a measurement result of uplink channel quality
    3-2. Configuration example on a user equipment side
4. Fourth Embodiment (Uplink power control)
    4-1. Configuration example on a base station side
        4-1-1. Configuration of an uplink path loss compensation factor $\alpha$
        4-1-2. Configuration of an uplink power correction value $\delta$
    4-2. Configuration example on a user equipment side
5. Embodiments of method according to the present disclosure
6. Computing device for implementing embodiments of the apparatus and the method according to the present disclosure 7. Application example of technology according to the present disclosure

1. First Embodiment (Establishment of Mapping Relationship Between Three-Dimensional Spatial Regions and Resources

1-1. Configuration Example on a Base Station Side

FIG. 1 is a block diagram showing an example of functional configuration of an apparatus on a base station side in a wireless communication system according to the first embodiment of the present disclosure.

As shown in FIG. 1, an apparatus 100 according to this embodiment may include a control unit 102.

The control unit 102 may be configured to: allocate a predetermined number of resources for each three-dimensional spatial region; and establish, according to a channel quality obtained based on each of the predetermined number of resources, mapping relationship between three-dimensional spatial regions and resources.

A division granularity and a division shape for the three-dimensional spatial regions may be set based on actual conditions. For example, the three-dimensional spatial regions may be divided based on a sphere, a cuboid or the like, and the division granularity may be set by appropriately setting a radius of the sphere, or a length, a width and a height of the cuboid, which are not limited herein.

In conventional LTE communication, when uplink transmission or downlink transmission is to be performed, a base station is usually required to allocate a predetermined number of uplink or downlink resources to user equipment in real time, and the base station or the user equipment measures the allocated uplink or downlink resources, to determine an optimal uplink or downlink resource suitable for the user equipment based on a measurement result, thereby improving transmission reliability. This is since a channel environment of the conventional user equipment on the ground is mostly based on a non-line-of-sight (NLoS) and has a large variation, which is not suitable for establishing a mapping relationship between resources and spatial regions. However, for unmanned aerial vehicle communication, a channel environment in which the unmanned aerial vehicle is located is mostly based on an LoS and has a small variation. Therefore, a mapping relationship between resources and spatial regions is established in advance, so as to save time spent on resource allocation and measurement, thereby reducing system delay and increasing system operation efficiency. In this way, when uplink or downlink transmission is to be performed, a uplink or downlink resources corresponding to a current three-dimensional spatial location of the unmanned aerial vehicle can be directly determined and allocated to the user equipment based on the current three-dimensional spatial location of the unmanned aerial vehicle and the established mapping relationship, without performing the resource allocation and the measurement in real time. Establishment of the mapping relationship between three-dimensional spatial regions and resources is described below with respect to downlink transmission and uplink transmission, respectively.

1-1-1. Establishment of a Mapping Relationship Between Three-Dimensional Spatial Regions and Downlink Resources The control unit 102 may be configured to: control, for each three-dimensional spatial region, a base station to transmit a downlink reference signal to one or more user equipment by utilizing each of a predetermined number of downlink resources; and determine, according to measurement results of downlink channel qualities fed back by the one or more user equipment based on the received downlink reference signal, a downlink resource for each three-dimensional spatial region among the predetermined number of downlink resources.

The downlink reference signal may include CSI-RS, CRS and the like. Here, the CSI-RS is taken as an example for description. In the LTE technology, a CSI-RS resource refers to a base station mapping a time-frequency resource on a resource element (RE) and transmitting the time-frequency resource via a beam. The user equipment measures the received CSI-RS resource and feeds back a measurement result (for example, a downlink CQI), so that the base station, comprehensively considering other factors, selects an appropriate CSI-RS resource based on the received measurement result, to allocate the selected CSI-RS resource to the user equipment. For example, the base station selects a CSI-RS resource corresponding to an optimal measurement result.

Preferably, for each three-dimensional spatial region, all allocable CSI-RS resources for the three-dimensional spatial region (that is, the predetermined number of CSI-RS resources) are traversed to determine a CSI-RS resource suitable for the three-dimensional spatial region. The predetermined number herein may be an integer multiple of 8, such as 8, 16, 24. In conventional LTE communication, the maximum number of CSI-RS resources is 8. However, in unmanned aerial vehicle communication, a dimension of height is required to be considered. Therefore, 8 CSI-RS resources may be insufficient, so that the maximum number of allocable CSI-RS resources may be required to be increased. In actual implementation, all of these predetermined number of CSI-RS resources may be allocated to one or more unmanned aerial vehicles to be measured, which is not limited herein, as long as all allocable CSI-RS resources for each three-dimensional spatial region are traversed.

Then, the control unit 102 may establish a mapping relationship between three-dimensional spatial regions and CSI-RS resources based on the CSI-RS resource determined for each three-dimensional spatial region. Since the CSI-RS resources correspond to downlink time-frequency resources, the mapping relationship may also represent a mapping relationship between three-dimensional spatial regions and downlink resources.

Figure 2:
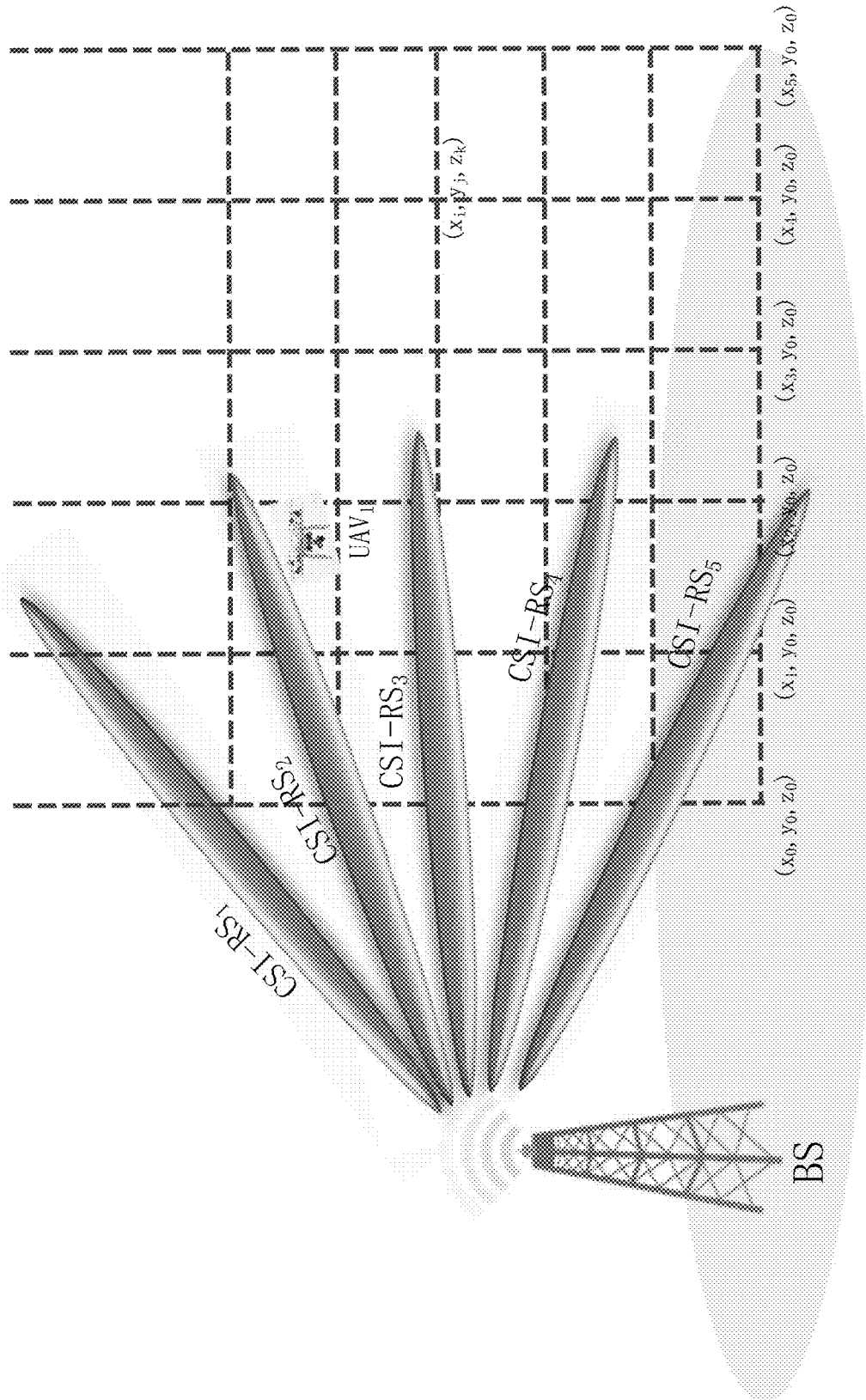
FIG. 2 is a schematic diagram showing an example of a mapping relationship between three-dimensional spatial regions and CSI-RS resources according to an embodiment of the present disclosure.

FIG. 2 is a schematic diagram showing an example of a mapping relationship between three-dimensional spatial regions and CSI-RS resources according to an embodiment of the present disclosure.

As shown in FIG. 2, it is assumed that 8 CSI-RS resources are allocated for a three-dimensional spatial region. A base station BS transmits, for example, 5 CSI-RS resources represented by $CSI-RS_1$ to $CSI-RS_5$, to an unmanned aerial vehicle $UAV_1$ in the three-dimensional spatial region. The unmanned aerial vehicle $UAV_1$ measures the received CSI-RS resources and feeds back 5 measurement results (for example, $CQI_1$ to $CQI_5$) to the base station BS. Further, the base station may transmit 3 CSI-RS resources that are represented by $CSI-RS_6$ to $CSI-RS_8$ to another unmanned aerial vehicle $UAV_2$ in the three-dimensional spatial region. The unmanned aerial vehicle $UAV_2$ measures the received CSI-RS resources and feeds back 3 measurement results (for example, $CQI_6$ to $CQI_8$) to the base station BS. It should be noted that in order to avoid ambiguity, the unmanned aerial vehicle $UAV_2$ and the CSI-RS resources allocated to the unmanned aerial vehicle $UAV_2$ are not shown in FIG. 2. Then, the base station may determine a CSI-RS resource suitable for the three-dimensional spatial region based on the eight measurement results $CQI_1$ to $CQI_8$ and other factors. For example, the base station allocates a CSI-RS resource corresponding to an optimal CQI to the three-dimensional spatial region. In this way, the mapping relationship between three-dimensional spatial regions and CSI-RS resources can be established.

Figure 3:
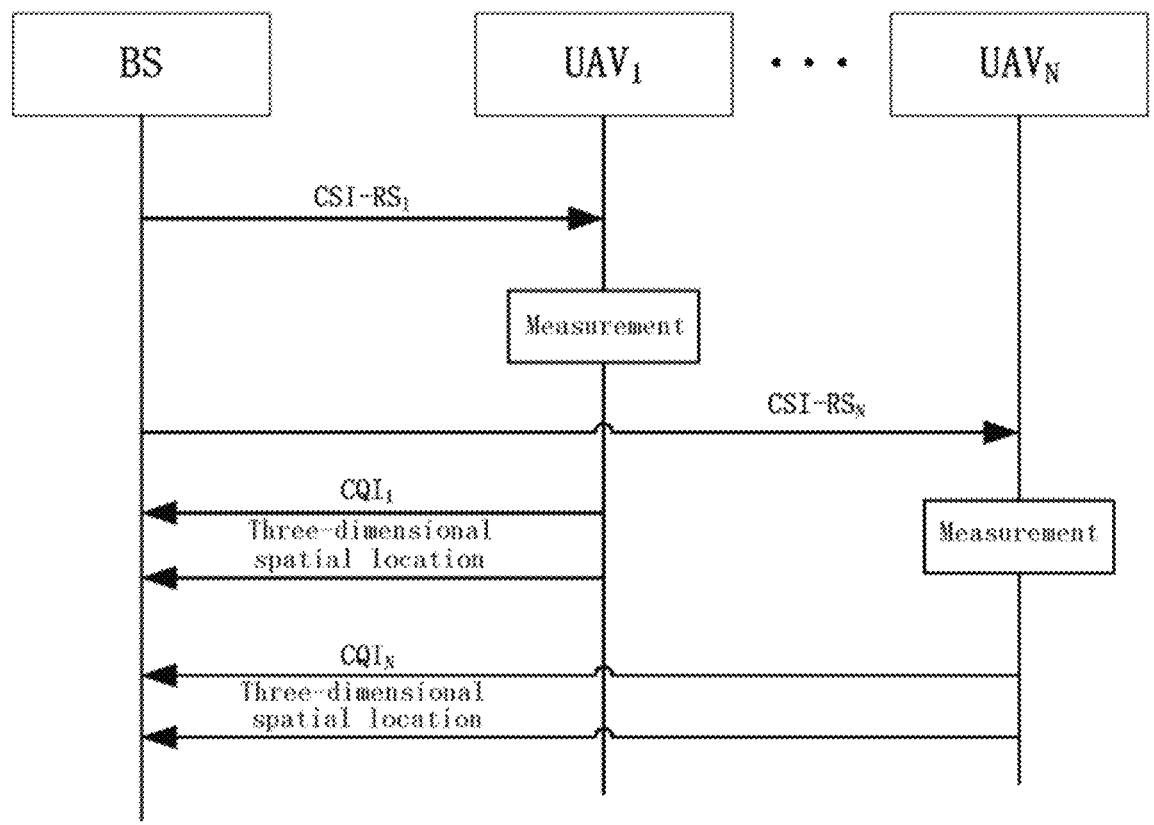
FIG. 3 is a flowchart showing an example of a signaling interaction process of establishing a mapping relationship between three-dimensional spatial regions and CSI-RS resources according to an embodiment of the present disclosure.

FIG. 3 is a flowchart showing an example of a signaling interaction process of establishing a mapping relationship between three-dimensional spatial regions and CSI-RS resources according to an embodiment of the present disclosure.

As shown in FIG. 3, the base station BS transmits CSI-RS resources $CSI-RS_1$ to $CSI-RS_N$ to multiple unmanned aerial vehicles $UAV_1$ to $UAV_N$. The unmanned aerial vehicles $UAV_1$ to $UAV_N$ measures the received CSI-RS resources respectively, and report measurement results $CQI_1$ to $CQI_N$ and current three-dimensional spatial locations of the unmanned aerial vehicles $UAV_1$ to $UAV_N$ to the base station BS. After traversing all CSI-RS resources for each three-dimensional spatial region, the base station may establish a mapping relationship between three-dimensional spatial regions and CSI-RS resources.

In addition, in conventional LTE communication, when performing downlink transmission, the base station usually first scans downlink transmission beams to select an appropriate downlink transmission beam for transmitting downlink data to the user equipment. Specifically, the base station transmits CSI-RS resources to the user equipment by utilizing different candidate downlink transmission beams. For example, as shown in FIG. 2, five CSI-RS resources are transmitted to the $UAV_1$ via five beams, respectively. Then, the base station selects an appropriate downlink transmission beam based on measurement results of the received CSI-RS resources from the user equipment. Different downlink transmission beams usually have different directions and transmission radii (corresponding to transmission power). Therefore, it is preferable to establish a mapping relationship between three-dimensional spatial regions and downlink transmission beams while establishing the mapping relationship between three-dimensional spatial regions and downlink resources, so as to further save time spent on selecting a downlink transmission beam during downlink transmission.

Figure 4:
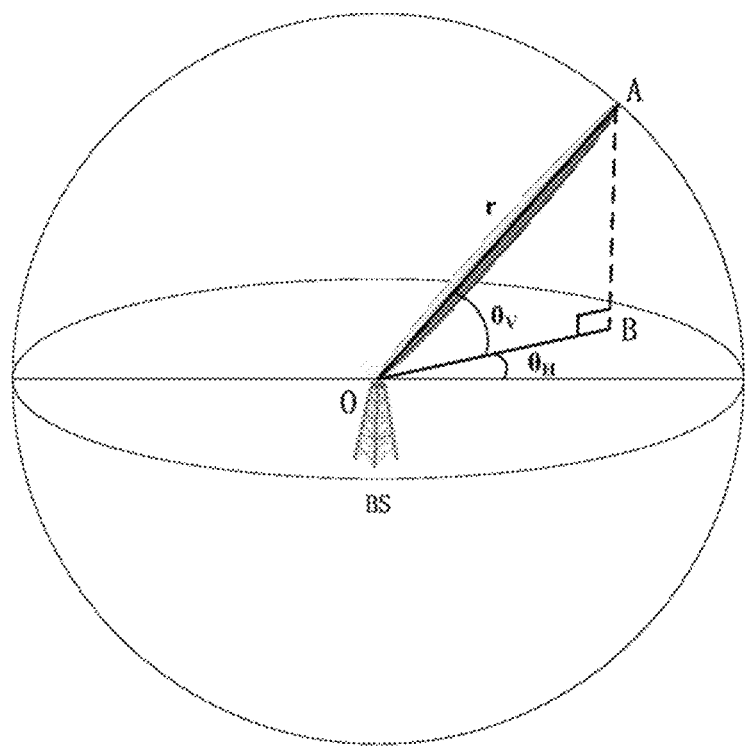
FIG. 4 is a schematic diagram showing an example of representation of a beam according to an embodiment of the present disclosure.

The determined downlink transmission beam may be represented by information indicative of an azimuth angle and a downlink transmission power. FIG. 4 is a schematic diagram showing an example of representation of a beam according to an embodiment of the present disclosure.

As shown in FIG. 4, it is assumed that there is a sphere space around the base station BS, each beam $\theta_A$ transmitted from the base station BS may be represented by three parameters $\theta_H$, $\theta_V$, and r. An angle $\theta_H$ is an included angle between a projection OB of the beam OA on a horizontal plane and a horizontal direction. An angle $\theta_V$ is an included angle between the projection OB and the beam OA. A radius r represents a transmission power affected radius of the beam OA, and may also represent a corresponding downlink transmission. power.

Specifically, the control unit 102 may control, for each three-dimensional spatial region, the base station to transmit a downlink reference signal to one or more user equipment by utilizing each of a predetermined number of downlink transmission beams, and determine, according to measurement results of downlink channel qualities fed back by the one or more user equipment based on the received downlink reference signal, a downlink transmission beam for each three-dimensional spatial region among the predetermined number of downlink transmission beams. An establishing unit 104 may establish, based on the downlink transmission beam determined for each three-dimensional spatial region, the mapping relationship between the three-dimensional spatial regions and the downlink transmission beams Here it is assumed that the maximum number of downlink transmission beams is M and the maximum number of CSI-RS resources is N. M may be equal or unequal to N. For each three-dimensional spatial region, a CSI-RS resource and a downlink transmission beam suitable for the three-dimensional spatial region are required to be selected from M×N combinations of beams and CSI-RS resources. Preferably, in order to reduce processing overhead, a part of the beams with a large deviation in direction may be excluded based on a relative location relationship between a three-dimensional spatial region and the base station, and a beam suitable for the three-dimensional spatial region may be selected from remaining beams.

As an example, the mapping relationship between the three-dimensional spatial regions and the downlink resources as well as the downlink transmission beams may be stored in a form of a table in which the three-dimensional spatial regions, the downlink resources, and the downlink transmission beams are associated with one another. Table 1 shows an example of a table for storing this mapping relationship.

TABLE 1

| Three-dimensional spatial region | x |
| --- | --- |
| | y |
| | z |
| Downlink resource | Time |
| | Frequency |
| Beam | $\theta_H$ |
| | $\theta_V$ |
| | r (Downlink transmission power) |

It should be noted that a coordinate (x, y, z) representing the three-dimensional spatial region in Table 1 may be, for example, a coordinate of a vertex of a three-dimensional spatial region in a shape of a cuboid, or a coordinate of a center of a three-dimensional spatial region in a shape of a sphere. A space occupied by each three-dimensional spatial region may be acquired based on the coordinate (x, y, z) representing the three-dimensional spatial region and a division granularity (for example, a length, a width and a height of a cuboid, or a radius of a sphere). That is, the three-dimensional spatial regions can be distinguished from each other based on coordinates (x, y, z).

It should be noted that the table shown herein is only an example, and those skilled in the art may modify the above table based on actual needs. For example, Table 1 may only include the mapping relationship between the three-dimensional spatial regions and the downlink resources. In another example, other transmission related parameter that may be utilized to establish a mapping relationship with the three-dimensional spatial regions based on a related measurement process may also be added to Table 1.

Preferably, the above mapping relationship may be updated periodically or aperiodically. For example, the base station may determine whether to update the mapping relationship according to a predetermined condition. For example, when the number of downlink demodulation failures increases, that is, the number of NACK feedback increases, it is indicated that a currently allocated downlink resource cannot guarantee transmission quality. Therefore, the resource allocation and the measurement may be re-performed for the three-dimensional spatial region to update a downlink resource corresponding to the three-dimensional spatial region. In another example, when performing network coordination, if the base station receives a high-interference indication from a neighboring base station, it is indicated that a currently allocated downlink resource and downlink transmission beam cause large interference to the neighboring base station. Therefore, a transmission power of the beam may be reduced or the resource allocation and beam selection may be re-performed to update the previously established mapping relationship. Furthermore, for example, different base stations may interact with each other and update respective mapping relationships, to optimize resource allocation and interference suppression. Details are not enumerated herein.

1-1-2. Establishment of a Mapping Relationship Between Three-Dimensional Spatial Regions and Uplink Resources Similar to the establishment of the mapping relationship between the three-dimensional spatial regions and the downlink resources, for uplink transmission, it may also be considered to establish a mapping relationship between the three-dimensional spatial regions and uplink resources. In this way, when uplink transmission is to be performed, an uplink resource may be directly allocated to the user equipment for uplink transmission without performing resource allocation and measurement in conventional LTE communication. For example, the base station allocates multiple SRS resources to the user equipment. The user equipment transmits an uplink reference signal SRS to the base station by utilizing the allocated SRS resources. The base station measures the received uplink reference signal and allocates an appropriate SRS resource to the user equipment based on a measurement result. In this way, time spent on uplink resource allocation and measurement can be saved, system delay can be reduced, system operation efficiency can be improved, which can enhance unmanned aerial vehicle communication.

Preferably, the control unit 102 may be further configured to: allocate, for each three-dimensional spatial region, a predetermined number of uplink resources to one or more user equipment; perform uplink channel quality measurement based on uplink reference signals transmitted by the one or more user equipment utilizing each of the predetermined number of uplink resources; and determine, according to a result of the uplink channel quality measurement, an uplink resource for each three-dimensional spatial region among the predetermined number of uplink resources.

The uplink reference signals include SRS, DRS and the like. The embodiment of the present disclosure is described by taking the SRS as an example.

Specifically, for each three-dimensional spatial region, all allocable SRS resources for the three-dimensional spatial region (that is, the predetermined number of SRS resources, including periodic and aperiodic SRS resources) are traversed to determine an SRS resource suitable for the three-dimensional spatial region. In actual implementation, all the predetermined number of SRS resources may be allocated to one or more unmanned aerial vehicles to be measured, which is not limited herein, as long as all allocable SRS resources for each three-dimensional spatial region are traversed.

For example, the base station allocates all of M allocable SRS resources for a three-dimensional spatial region to one or more unmanned aerial vehicles in the three-dimensional spatial region, receives M SRS signals from the one or more unmanned aerial vehicles, measures the M SRS signals, selects an appropriate SRS resource (for example, an SRS resource corresponding to an optimal measurement result of uplink channel quality) from the M SRS resources according to a measurement result of uplink channel quality and allocates the selected SRS resource to the three-dimensional spatial region.

Then, the control unit 102 may establish a mapping relationship between the three-dimensional spatial regions and the SRS resources based on the SRS resource determined for each three-dimensional spatial region. Since the SRS resources correspond to the uplink time-frequency resources, the mapping relationship may also be considered as a mapping relationship between the three-dimensional spatial regions and the uplink resources.

Figure 5:
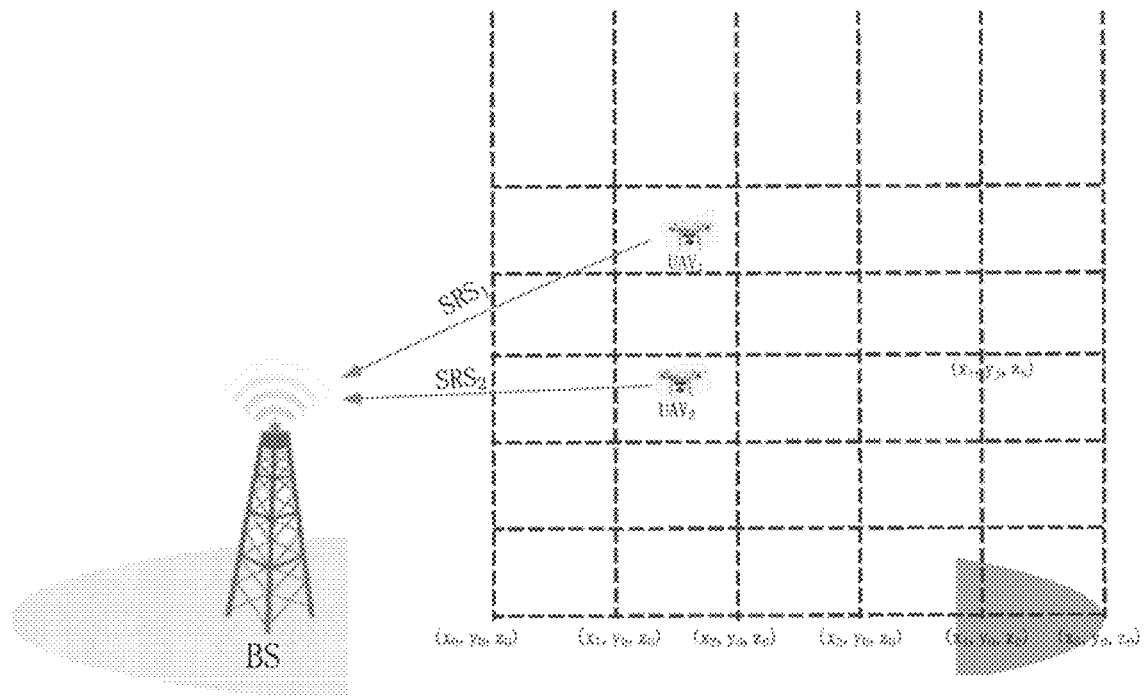
FIG. 5 is a schematic diagram showing an example of a mapping relationship between three-dimensional spatial regions and SRS resources according to an embodiment of the present disclosure.

FIG. 5 is a schematic diagram showing an example of a mapping relationship between three-dimensional spatial regions and SRS resources according to an embodiment of the present disclosure.

As shown in FIG. 5, the base station BS allocates SRS resources to unmanned aerial vehicles $UAV_1$ and $UAV_2$ in different spatial regions, and receives uplink reference signals $SRS_1$ and $SRS_2$ transmitted by the unmanned aerial vehicles $UAV_1$ and $UAV_2$ utilizing the allocated SRS resources, measures the received uplink reference signals $SRS_1$ and $SRS_2$, and determines, according to measurement results, SRS resources for the spatial regions where the unmanned aerial vehicles $UAV_1$ and $UAV_2$ are respectively located. In this way, the mapping relationship between spatial regions and the SRS resources is established.

Figure 6:
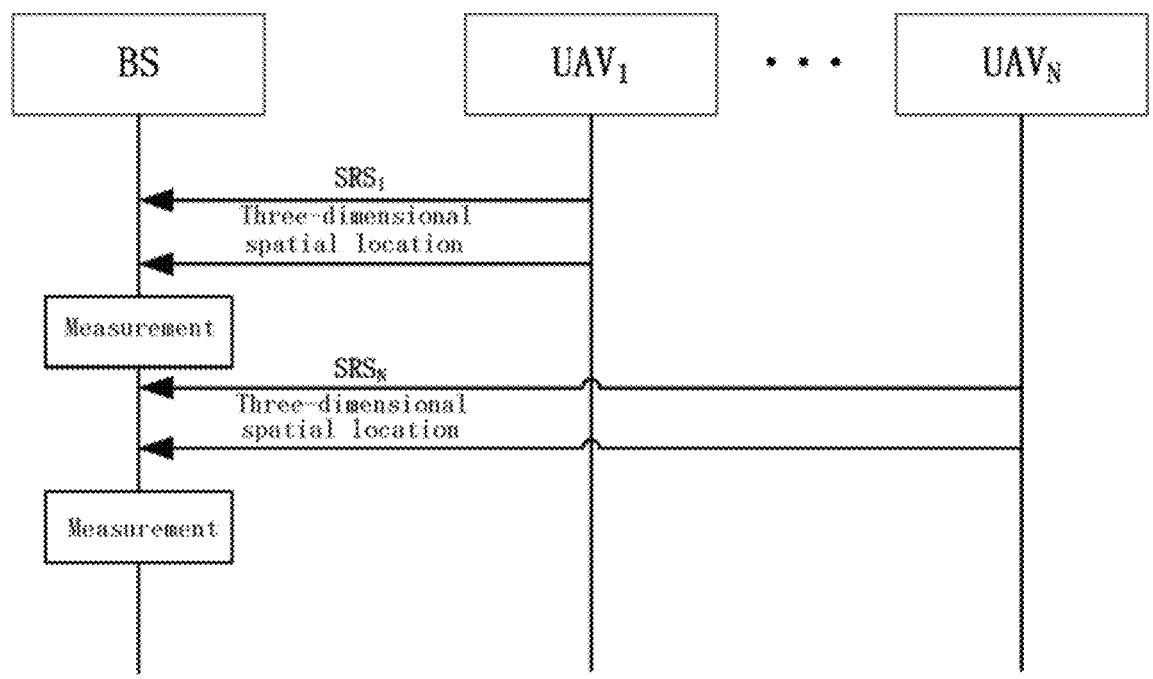
FIG. 6 is a flowchart showing an example of a signaling interaction process of establishing a mapping relationship between three-dimensional spatial regions and SRS resources according to an embodiment of the present disclosure.

FIG. 6 is a flowchart showing an example of a signaling interaction process of establishing a mapping relationship between three-dimensional spatial regions and SRS resources according to an embodiment of the present disclosure.

As shown in FIG. 6, the unmanned aerial vehicles $UAV_1$ to $UAV_N$ transmit uplink reference signals $SRS_1$ to $SRS_N$ to the base station BS by utilizing SRS resources allocated by the base station BS, and report current three-dimensional spatial locations of the unmanned aerial vehicles $UAV_1$ to $UAV_N$ to the base station BS, respectively. The base station BS measures the received uplink reference signals. After traversing all SRS resources for each three-dimensional spatial region, the base station may establish a mapping relationship between three-dimensional spatial regions and the SRS resources.

As an example, the mapping relationship between the three-dimensional spatial regions and the uplink resources may be stored in a form of a table in which the three-dimensional spatial regions and the uplink resources are associated with each other. Table 2 shows an example of a table for storing the mapping relationship.

TABLE 2

| Three-dimensional spatial region | x |
| | y |
| | z |
| Uplink resource | Time |
| | Frequency |

Meaning of a coordinate of the three-dimensional spatial region in Table 2 is the same as that in Table 1 above, and is not repeated herein.

It should be noted that the table shown herein is only an example, and those skilled in the art may modify the above table based on actual needs. For example, other transmission related parameter that may be utilized to establish a mapping relationship with the three-dimensional spatial regions based on the above measurement process may also be added to Table 2.

As an example, the control unit 102 may preferably determine an uplink path loss compensation factor (that is, a parameter α) and/or an uplink power correction value (that is, a parameter δ) for each three-dimensional spatial region based on the above process for measuring the SRS resources, so as to establish a mapping relationship between three-dimensional spatial regions and uplink path loss compensation factors and/or an uplink power correction values. Therefore, the parameter α and/or the parameter δ corresponding to each three-dimensional spatial region may be added to Table 2. In this way, during subsequent uplink transmission, the base station may directly allocate an uplink resource and a corresponding uplink power control parameter to the user equipment based on the three-dimensional spatial region where the user equipment is located, thereby further reducing the processing delay and improving system performance.

Preferably, the above mapping relationship may be updated periodically or aperiodically. For example, the base station may determine whether to update the above mapping relationship based on a predetermined condition. For example, when the number of uplink demodulation failures increases, it is indicated that a currently allocated uplink resource cannot guarantee the transmission quality. Therefore, the resource allocation and the measurement may be re-performed for the three-dimensional spatial region to update an uplink resource corresponding to the three-dimensional spatial region. In another example, when the base station receives a high-interference indication from a neighboring base station, an uplink power control parameter may be adjusted to reduce interference to the neighboring base station. Furthermore, for example, different base stations may interact with each other and update respective mapping relationships, to optimize resource allocation and interference suppression. Details are not enumerated herein.

Here, it should be noted that although the establishment of the mapping relationship between the downlink resources and the three-dimensional spatial regions as well as the establishment of the mapping relationship between the uplink resources and the three-dimensional spatial regions are described based on the downlink transmission and the uplink transmission respectively, the two mapping relationships may be combined. For example, Table 1 and Table 2 are stored in a combined manner, so as to be applicable to both of the downlink transmission and the uplink transmission.

1-2. Configuration Example on a User Equipment Side

Figure 7:
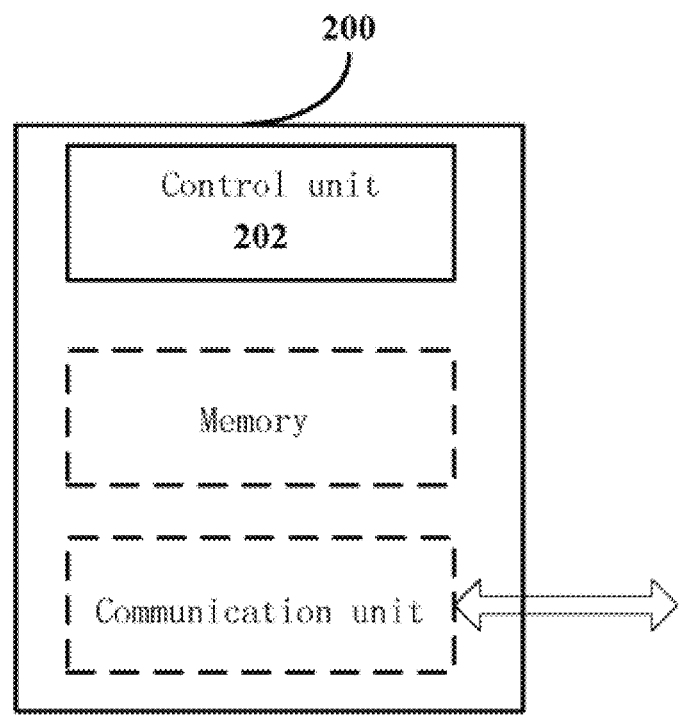
FIG. 7 is a block diagram showing an example of functional configuration of an apparatus on a user equipment side in a wireless communication system according to the first embodiment of the present disclosure.

Corresponding to the above configuration example on the base station side, a configuration example on the user equipment side is described below. FIG. 7 is a block diagram showing an example of functional configuration of an apparatus on a user equipment side in a wireless communication system according to the first embodiment of the present disclosure.

As shown in FIG. 7, an apparatus 200 according to this embodiment may include a control unit 202.

The control unit 202 may be configured to control, based on a predetermined number of resources allocated by a base station for each three-dimensional spatial region, user equipment to transmit a channel quality measurement result and/or an uplink reference signal to the base station, for the base station to establish a mapping relationship between three-dimensional spatial regions and resources.

Specifically, in a case of downlink transmission, the control unit 202 may measure multiple CSI-RS resources from the base station and feeds back corresponding measurement results (for example, CQIs indicating measurement results of downlink channel quality), so that the base station may allocate an appropriate CSI-RS resource for the three-dimensional spatial region based on the received measurement results and other factors.

Further, in a case of uplink transmission, the control unit 202 may control the user equipment to transmit an uplink reference signal SRS to the base station based on an SRS resources allocated by the base station. Then, the base station measures the received SRS, and allocates an appropriate SRS resource for the three-dimensional spatial region based on a measurement result and other factors.

In this way, a mapping relationship between three-dimensional spatial regions and downlink resources as well as uplink resources is established.

It should be noted that the embodiment of the apparatus on the user equipment side described herein corresponds to the above embodiment of the apparatus on the base station side. Therefore, details that are not described here may refer to the corresponding description in the above, and are not repeated here.

2. Second Embodiment (Resource Allocation and Transmission Control Based on Mapping Relationship

2-1. Configuration Example on a Base Station Side

Figure 8:
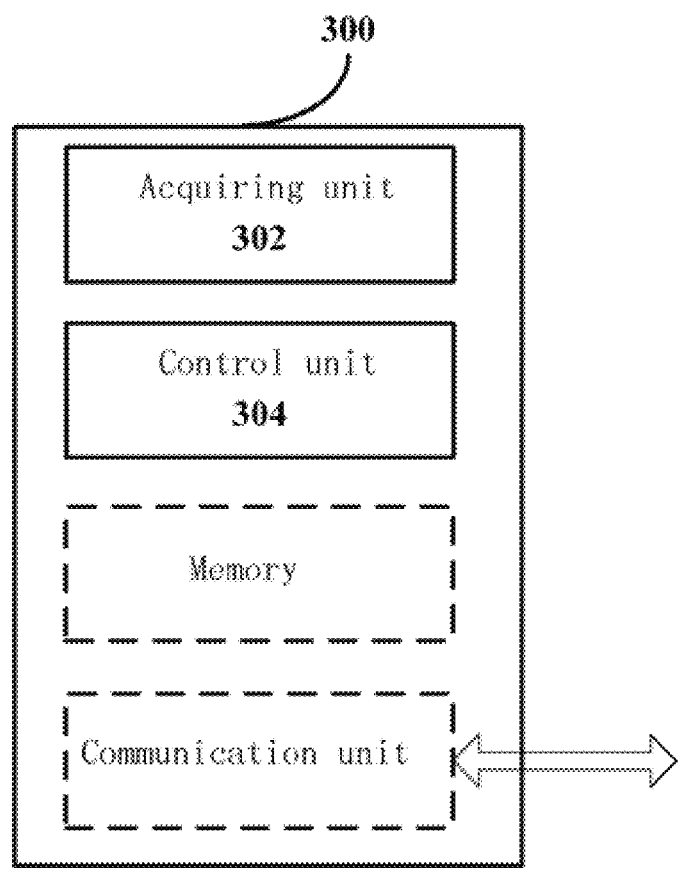
FIG. 8 is a block diagram showing an example of functional configuration of an apparatus on a base station side in a wireless communication system according to a second embodiment of the present disclosure.

FIG. 8 is a block diagram showing an example of functional configuration of an apparatus on a base station side in a wireless communication system according to the second embodiment of the present disclosure.

As shown in FIG. 8, an apparatus 300 according to this embodiment may include an acquiring unit 302 and a control unit 304.

The acquiring unit 302 may be configured to acquire a current three-dimensional spatial location of user equipment.

Specifically, the user equipment may periodically or periodically report its current three-dimensional spatial location to the base station. For example, location information of the user equipment is included in a measurement report, so that the base station may acquire the current three-dimensional spatial location of the user equipment user from the received measurement report.

The control unit 304 may be configured to determine a resource for the user equipment according to information indicating at least mapping relationship between three-dimensional spatial regions and resources.

Specifically, the control unit 304 determines a spatial region in which the current three-dimensional spatial location of the user equipment is located, and determines a resource suitable for the user equipment according to information indicating the mapping relationship between the three-dimensional spatial regions and the resources that is stored in an internal memory or an external memory in advance.

It should be noted that the mapping relationship here may be established by performing, for example, the process described in the first embodiment, or may be established by performing other existing method or a method that may appear in the future. In this embodiment, the establishment of the mapping relationship is not limited, and only the established mapping relationship being utilized for resource allocation and transmission control is of interest. Preferably, the information indicating the mapping relationship may be stored in a table, such as Table 1 or Table 2 established above, so that the control unit 304 may determine a resource suitable for the user equipment by looking up the table based on the location information of the user equipment.

Preferably, the mapping relationship may indicate a mapping relationship between three-dimensional spatial regions and downlink resources, so that the control unit 304 may determine a downlink resource suitable for the user equipment according to the information indicating the mapping relationship and the three-dimensional spatial location of the user equipment, and controls the base station to perform downlink transmission to the user equipment by utilizing the determined downlink resource.

In addition, preferably, the mapping relationship may also indicate a mapping relationship between three-dimensional spatial regions and downlink transmission beams, so that the control unit 304 may determine a downlink transmission beam for the user equipment according to the information indicating the mapping relationship and the three-dimensional spatial location of the user equipment, and controls the base station to perform downlink transmission to the user equipment by utilizing the determined downlink transmission beam.

It can be seen that in the case of downlink transmission, by utilizing the pre-established mapping relationship between the three-dimensional spatial regions and the downlink resources as well as the downlink transmission beams, an appropriate downlink resource and downlink transmission beam can be directly allocated to the user equipment according to the current three-dimensional spatial location of the user equipment for downlink transmission, without performing resource allocation and measurement in real time, thereby saving processing time, reducing the system delay, and improving the system operation efficiency.

Preferably, in addition to being utilized for downlink transmission control, the mapping relationship between the three-dimensional spatial regions and the downlink transmission beams may also be utilized to facilitate adjustment of an uplink transmission angle in uplink transmission.

Compared with the conventional user equipment in the LTE communication system, the unmanned aerial vehicle may be equipped with a directional antenna. That is, the unmanned aerial vehicle has a capability of beam-forming rather than a capability of beam-steering. Therefore, in order to improve the uplink transmission quality, reduce energy consumption of the unmanned aerial vehicle, and reduce the delay, a solution that the base station assists the unmanned aerial vehicle in adjusting the uplink transmission angle is provided according to the present disclosure. That is, the unmanned aerial vehicle aligns its directional antenna with the base station by adjusting the uplink transmission angle, so as to improve the transmission quality.

Specifically, the control unit 304 may determine, according to the three-dimensional spatial location of the user equipment, a downlink transmission beam for the three-dimensional spatial location by, for example, looking up a stored mapping relationship, and controls the base station to notify the user equipment of information related to the determined downlink transmission beam, for the user equipment to perform uplink transmission with respect to the base station based on the downlink transmission beam.

As an example embodiment, the control unit 304 may directly transmit the information related to the determined downlink transmission beam (for example, the above parameters $\theta_H$, $\theta_V$ and r that represent the beam) to the user equipment. The user equipment calculates a corresponding uplink transmission angle based on the information related to the determined downlink transmission beam. Alternatively, in order to reduce calculation load of the user equipment, the control unit 304 may calculate a corresponding uplink transmission angle based on the information related to the determined downlink transmission beam, and transmits the information of the finally determined uplink transmission angle to the user equipment. By way of example rather than limitation, an example of calculating an uplink transmission angle based on a downlink transmission beam is described in detail below with reference to FIG. 9.

Figure 9:
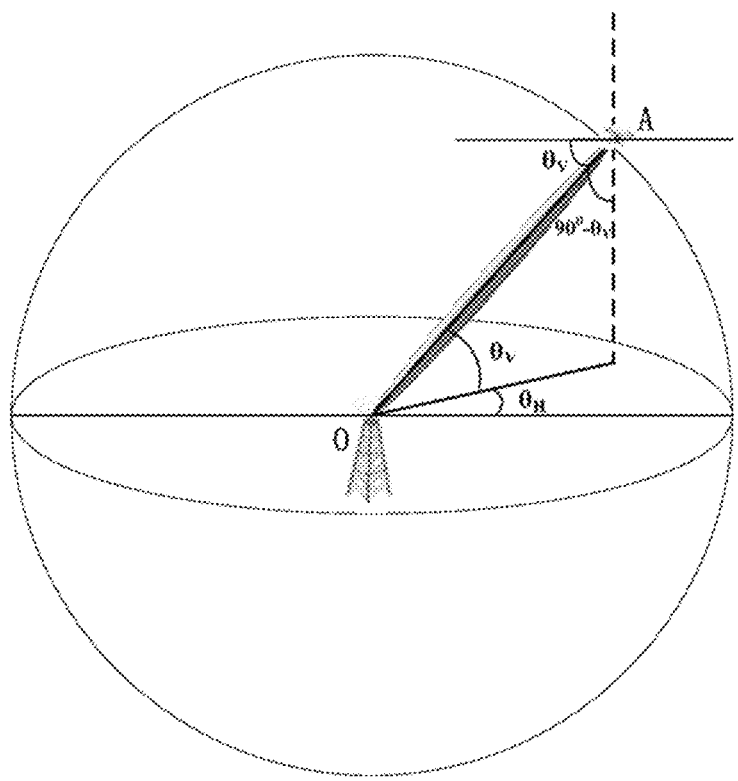
FIG. 9 is a schematic diagram showing an example of determining an uplink transmission angle based on a downlink transmission beam according to an embodiment of the present disclosure.

FIG. 9 is a schematic diagram showing an example of determining an uplink transmission angle based on a downlink transmission beam according to an embodiment of the present disclosure.

As shown in FIG. 9, it is assumed that for user equipment in a three-dimensional spatial region, the base station determines a downlink transmission beam $\theta_A$ corresponding to the region based on a known mapping relationship. The downlink transmission beam $\theta_A$ is represented by the parameters $\theta_H$, $\theta_V$ and r, so that a corresponding uplink transmission angle (which is represented as an angle relative to a vertical direction herein) is expressed as $(90°-\theta_V)$.

In this way, the unmanned aerial vehicle may, for example, adjust its flying posture (pitch angle) in the air based on the uplink transmission angle to align its directional antenna with the base station, so as to improve the uplink transmission quality.

It should be noted that FIG. 9 shows only an example of determining the uplink transmission angle, and those skilled in the art may adjust determination of the uplink transmission angle based the principles of the present disclosure. For example, the uplink transmission angle may be expressed as an angle relative to a horizontal direction, that is, the uplink transmission angle is equal to the angle $\theta v$.

Preferably, the mapping relationship may be a mapping relationship between three-dimensional spatial regions and uplink resources, so that the control unit 304 may determine a spatial region where the user equipment is located according to the acquired location information of the user equipment, determines an uplink resource for the user equipment by looking up information indicating the mapping relationship, and allocates the determined uplink resource to the user equipment, for the user equipment to perform uplink transmission and/or device-to-device (D2D) communication.

How to allocate, based on the relationship between the three-dimensional spatial regions and the uplink resources, a resource to the user equipment for D2D communication is described in detail below.

Specifically, the base station may determine corresponding uplink resources based on a spatial region where the unmanned aerial vehicle is located, allocates a part of resources from the uplink resources for D2D communication, and may, for example, broadcast the allocated resources through system information (SIB). When the unmanned aerial vehicle (having a capability of D2D communication)

is to perform D2D communication, the unmanned aerial vehicle may monitor the allocated resources for D2D communication, and select unutilized resources from the allocated resources for transmitting information to a surrounding unmanned aerial vehicle.

In addition, preferably, the mapping relationship may also represent a mapping relationship between three-dimensional spatial regions and uplink power control parameters (including but not limited to the uplink path loss compensation factor and the uplink power correction value), and may be stored on the base station side. In this way, the control unit 304 may determine an uplink path loss compensation factor and/or an uplink power correction value for the user equipment according to the spatial location of the user equipment and information indicating the mapping relationship, and control the base station to transmit the determined uplink path loss compensation factor and/or uplink power correction value to the user equipment, for the user equipment to adjust the uplink transmission power.

Alternatively, the control unit 304 may transmit information indicating the mapping relationship between the three-dimensional spatial regions and the uplink path loss compensation factors and/or the uplink power correction values to the user equipment. The user equipment may store the information in the internal memory or external memory. In this way, when performing uplink transmission, the user equipment may determine an appropriate uplink path loss compensation factor and/or uplink power correction value according to the three-dimensional spatial location of the user equipment and the stored mapping relationship, and adjust the uplink power and perform uplink transmission based on the determined parameter.

It should be noted that the base station may combine the established mapping relationship between the downlink resources and the spatial regions with the mapping relationship between the uplink resources and the spatial regions, so as to further optimize the transmission control. For example, in a process of uplink transmission, after acquiring the spatial location of the user equipment, the base station may directly allocate an uplink resource to the user equipment according to the mapping relationship between the spatial regions and the uplink resources, and notify the user equipment of a corresponding uplink transmission angle according to the mapping relationship between the spatial regions and the downlink resources as well as the downlink transmission beams, so as reduce delay in uplink transmission and improve the transmission quality.

It should further be noted that the apparatus on the base station side in the first and second embodiments described above with reference to FIGS. 1 and 8 may be implemented at a chip level, or may be implemented at a device level by including other external components. For example, the apparatus may function as a base station, and includes a communication unit (optionally, represented by a dashed box) for performing communication operations. The communication unit may include one or more communication interfaces to support communication with different devices. An implementation form of the communication unit is not limited herein. Preferably, the apparatus may further include a memory (optionally, represented by a dashed box) for storing the above table of mapping relationship.

2-2. Configuration Example on a User Equipment Side

Figure 10:
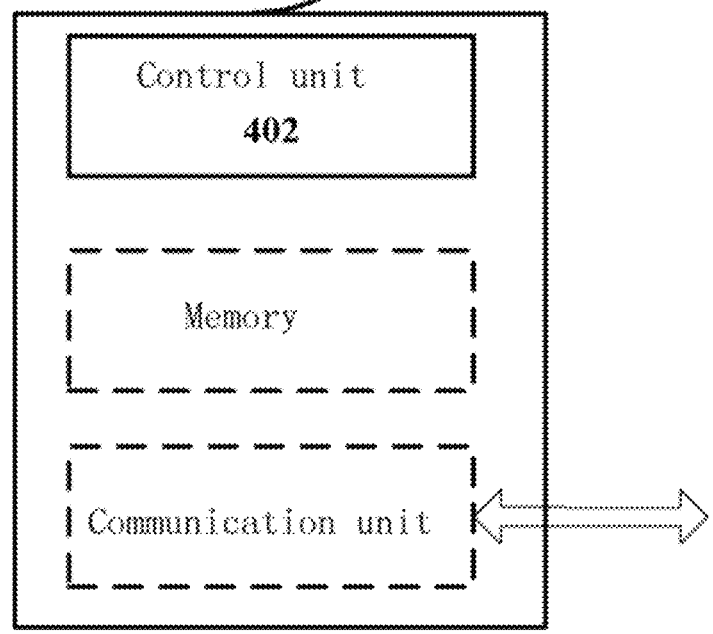
FIG. 10 is a block diagram showing an example of functional configuration of an apparatus on a user equipment side in a wireless communication system according to the second embodiment of the present disclosure.

Corresponding to the configuration example on the base station side, a configuration example on the user equipment side is described below. FIG. 10 is a block diagram showing an example of functional configuration of an apparatus on a user equipment side in a wireless communication system according to the second embodiment of the present disclosure.

As shown in FIG. 10, an apparatus 400 according to this embodiment may include a control unit 402.

The control unit 402 may be configured to: control user equipment to report a current three-dimensional spatial location to a base station; and control, based on a resource which is determined by the base station according to the current three-dimensional spatial location and information indicating at least mapping relationship between three-dimensional spatial regions and resources, the user equipment to perform communication operations.

Specifically, for example, the user equipment may periodically or aperiodically report, based on information of measurement and report from the base station, location information of the user equipment to the base station by including the location information in a measurement report. In this way, the base station can allocate an appropriate uplink/downlink resource to the user equipment according to the location information of the user equipment and a pre-established mapping relationship between the three-dimensional spatial regions and the resources, so that the user equipment can perform uplink transmission or D2D transmission or downlink reception based on the allocated uplink/downlink resource.

The mapping relationship may be a mapping relationship between three-dimensional spatial regions and downlink resources. The base station determines a corresponding downlink resource according to the current three-dimensional spatial location of the user equipment, and notifies the user equipment of the determined downlink resource through a field of "resource block assignment" in downlink control information (DCI), so that the control unit 402 on the user equipment side may determine, by decoding the received DCI, a downlink time-frequency resource for the base station to transmit downlink data, and controls the user equipment to receive downlink data utilizing the time-frequency resource.

Preferably, the mapping relationship may also represent a mapping relationship between the three-dimensional spatial regions and downlink transmission beams. The mapping relationship may be utilized, for example, to assist the user equipment in adjusting an uplink transmission angle. Specifically, the base station determines a corresponding downlink transmission beam according to the current three-dimensional spatial location of the user equipment, and transmits information of the determined downlink transmission beam or the uplink transmission angle determined based on the downlink transmission beam (where a specific determination process may refer to the above description with reference to FIG. 9) to the user equipment.

In a case that the base station directly transmits the information of the determined downlink transmission beam to the user equipment, the control unit 402 on the user equipment side is required to first calculate the corresponding uplink transmission angle based on the information of the downlink transmission beam, and then controls the user equipment to perform uplink transmission to the base station based on the calculated uplink transmission angle. Further, in a case that the base station transmits information of the uplink transmission angle determined based on the downlink transmission beam to the user equipment, the control unit 402 on the user equipment side may directly perform uplink transmission by utilizing the uplink transmission angle, thereby reducing processing load on the user equipment side.

In an example of adjusting the uplink transmission angle, the control unit 402 on the user equipment side may control, according to information related to the uplink transmission angle that is notified by the base station, the user equipment to adjust a posture of the user equipment (for example, a pitch angle of the unmanned aerial vehicle in the air), so as to align a directional antenna of the user equipment with the base station, thereby improving the uplink transmission quality.

Preferably, the mapping relationship may be a mapping relationship between the three-dimensional spatial regions and uplink resources. The base station determines a corresponding uplink resource according to the current three-dimensional spatial location of the user equipment, and notifies the user equipment of the determined uplink resource through a field of "resource block assignment and hopping resource allocation" in the downlink control information (DCI), so that the control unit 402 on the user equipment side may determine an uplink time-frequency resource allocated by the base station by decoding the received DCI, and controls the user equipment to perform uplink transmission to the base station and/or perform D2D transmission to other devices based on the corresponding time-frequency resource.

Preferably, the mapping relationship may be a mapping relationship between the three-dimensional spatial regions and uplink path loss compensation factors and/or uplink power correction values.

The base station may determine a corresponding uplink path loss compensation factor and/or uplink power correction value according to the current three-dimensional spatial location of the user equipment and notify the user equipment of the determined uplink path loss compensation factor and/or uplink power correction value, so that the control unit 402 on the user equipment side may control, based on the uplink path loss compensation factor and/or uplink power correction value notified by the base station, the user equipment to perform uplink transmission to the base station, including transmission of uplink data and transmission of uplink reference signals.

Alternatively, the base station may transmit information indicating the mapping relationship between the three-dimensional spatial regions and uplink path loss compensation factors and/or uplink power correction values to the user equipment for storage, so that the control unit 402 on the user equipment side may determine an appropriate uplink power control parameter according to a current location of the control unit 402 and stored information, and performs uplink transmission by utilizing the determined uplink power control parameter.

It should be noted that the embodiment of the apparatus on the user equipment side in the second embodiment described herein corresponds to the embodiment of the apparatus on the base station side in the second embodiment. Details not described here may refer to the above description, and are not repeated here.

In addition, it should be noted that the apparatuses on the user equipment side in the first and second embodiments described with reference to FIGS. 7 and 10 may be implemented at a chip level, or may be implemented at a device level by including other external components. For example, the apparatus may function as user equipment, and includes a communication unit (optionally, represented by a dashed box) for performing communication operations. The communication unit may include one or more communication interfaces to support communication with different devices. An implementation form of the communication unit is not limited herein. Preferably, the apparatus may further include a memory (optionally, represented by a dashed box) for storing, for example, a mapping relationship between the three-dimensional spatial regions and the uplink power control parameters that is notified by the base station, and the like.

Further, it should be noted that, although the first and second embodiments are described above for the establishment of the mapping relationship and utilization of the mapping relationships respectively for convenience of description, which does not indicate that the two embodiments are required to be implemented separately. On the contrary, in actual implementation, the two embodiments may be combined. For example, the base station may establish the mapping relationship, performs transmission control such as resource allocation by utilizing the mapping relationship, and dynamically updates the established mapping relationship based on actual conditions when utilizing the mapping relationship.

According to the first and second embodiments, based on characteristics of channel environment for unmanned aerial vehicle communication, a mapping relationship between the three-dimensional spatial regions and the resources is established in advance, so that in a subsequent communication process, the appropriate resource can be directly allocated based on the location information of the unmanned aerial vehicle, without performing resource allocation and measurement in real time, thereby reducing the system latency and improving the system transmission performance. Further, a mapping relationship between spatial regions and transmission control parameters such as beams, uplink path loss compensation factors and/or uplink power correction values is established, so as to further improve the transmission performance. In addition, the established mapping relationship may be dynamically updated based on an actual communication state, so as to optimize resource allocation and improve the transmission performance.

3. Third Embodiment

As described above, the unmanned aerial vehicle is usually equipped with a directional antenna and may adjust a flying posture of the unmanned aerial vehicle in the air. Therefore, the base station may assist the unmanned aerial vehicle in adjusting a direction of the directional antenna of the unmanned aerial vehicle, which is equivalent to achieving beam-forming to a certain extent. In this way, compared with the conventional user equipment in LTE communication, the uplink transmission quality can be improved. An example that the base station assists the unmanned aerial vehicle in adjusting the uplink transmission angle is described in this embodiment.

3-1. Configuration Example on a Base Station Side

Figure 11:
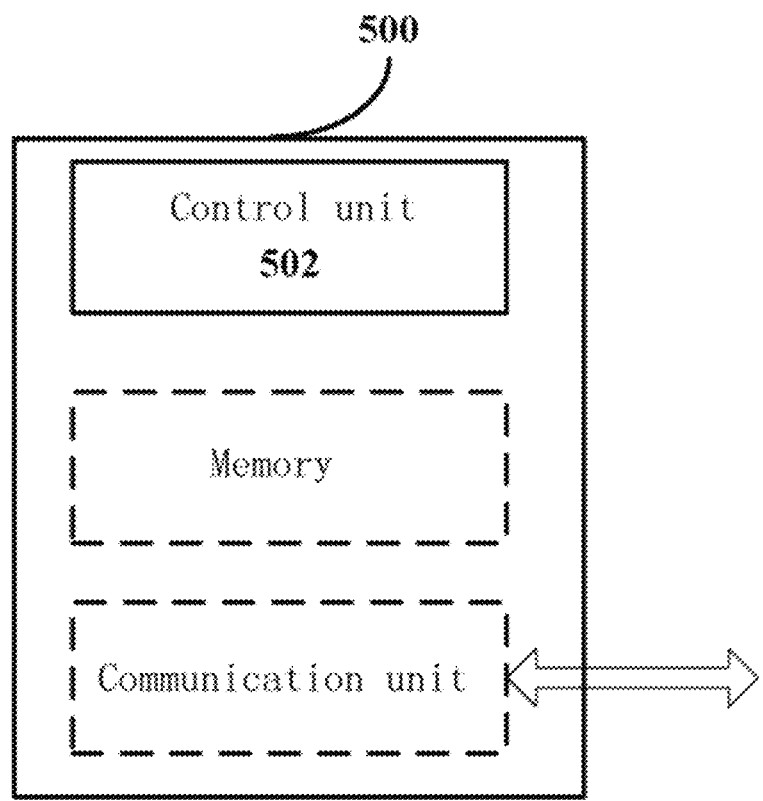
FIG. 11 is a block diagram showing an example of functional configuration of an apparatus on a base station side in a wireless communication system according to a third embodiment of the present disclosure.

FIG. 11 is a block diagram showing an example of functional configuration of an apparatus on a base station side in a wireless communication system according to the third embodiment of the present disclosure.

As shown in FIG. 11, an apparatus 500 according to this embodiment may include a control unit 502.

The control unit 502 may be configured to: determine, based on a measurement result of a downlink channel quality or an uplink channel quality between a base station and user equipment, information related to an uplink transmission angle of the user equipment; and control the base station to notify the user equipment of the determined information related to the uplink transmission angle, for the user equipment to perform uplink transmission based on the uplink transmission angle.

Specifically, the uplink transmission angle may be determined based on the measurement result of the downlink channel quality. The base station determines a downlink transmission beam for the user equipment based on a downlink transmission beam scanning process. Then the base station or the user equipment calculates the corresponding uplink transmission angle based on the determined downlink transmission beam. Alternatively, the uplink transmission angle may be determined based on the measurement result of the uplink channel quality. The base station measures an uplink reference signal from the user equipment and instructs the user equipment to adjust the uplink transmission angle based on the measurement result until the measured uplink channel quality satisfies a predetermined condition. The two manners for adjusting the uplink transmission angle are described in detail below.

3-1-1. Determination of an Uplink Transmission Angle Based on a Measurement Result of Downlink Channel Quality Principles of determining the uplink transmission angle based on the measurement result of the downlink channel quality is shown in FIG. 9. After determining the downlink transmission beam for the user equipment (for example, a beam $\theta_A$ represented by parameters $\theta_H$, $\theta_V$, and r in FIG. 9), the base station may determine that the uplink transmission angle of the user equipment for the base station is equal to (90°-$\theta_V$) (an angle relative to the vertical direction). Therefore, it is considered to determine the uplink transmission angle based on a downlink beam scanning process.

Specifically, the control unit 502 may control the base station to transmit a downlink reference signal (for example, CSI-RSs) to the user equipment by utilizing a predetermined number of candidate downlink transmission beams. The user equipment measures the received downlink reference signal and feeds back measurement results (for example, CQI indicating the downlink channel quality). The control unit 502 determines, based on the received measurement results for the candidate downlink transmission beams, an appropriate downlink transmission beam for the user equipment. Then, the control unit 502 may control the base station to notify the user equipment of information related to the determined downlink transmission beam.

The information related to the downlink transmission beam may be the determined downlink transmission beam, so that the user equipment calculates the corresponding uplink transmission angle by performing, for example, the process described with reference to FIG. 9.

Alternatively, the information related to the downlink transmission beam may be an uplink transmission angle calculated by the apparatus on the base station side based on the downlink transmission beam. That is, the control unit 502 on the base station side may calculate the corresponding uplink transmission angle based on the determined downlink transmission beam by performing the process described with reference to FIG. 9, and controls the base station to transmit the calculated uplink transmission angle to the user equipment. In this way, processing overhead on the user equipment side can be reduced and power consumption can be reduced.

3-1-2. Determination of an Uplink Transmission Angle Based on a Measurement Result of Uplink Channel Quality The uplink transmission angle being determined based on the measurement result of the uplink channel quality is that the base station instructs the user equipment to adjust the uplink transmission angle based on the measurement result of the uplink reference signal from the user equipment, and then measures the uplink reference signal that is transmitted by the user equipment utilizing the adjusted uplink transmission angle. If the measurement result is not satisfactory, the base station continuously instructs the user equipment to adjust the uplink transmission angle until the measurement result satisfies the predetermined condition.

Specifically, it is assumed that an initial uplink transmission angle of the user equipment for the base station is $\gamma_0$, the control unit 502 allocates an uplink resource $SRS_0$ to the user equipment, and measures an uplink reference signal transmitted by the user equipment utilizing the resource to obtain, for example, CQI indicating the uplink channel quality. If the obtained CQI does not satisfy the predetermined condition, the control unit 502 instructs the user equipment to adjust the uplink transmission angle of the user equipment to be an angle $\gamma_1$, re-allocates an uplink resource $SRS_1$ ($SRS_1$ may be identical to or different from $SRS_0$) to the user equipment, and measures an uplink reference signal transmitted by the user equipment utilizing the angle $\gamma_1$ and the resource $SRS_1$. In this way, the resource allocation, channel quality measurement, and angle adjustment are repeated until the measured uplink channel quality satisfies the predetermined condition. Each adjustment amount (including an adjustment magnitude and an adjustment tendency (increasing or decreasing)) of the uplink transmission angle may be determined by the base station based on the measurement result and other factors, and is not described in detail herein.

3-2. Configuration Example on a User Equipment Side

Corresponding to the configuration example on the base station side, a configuration example on the user equipment side is described below with reference to FIG. 12, which is a block diagram showing an example of functional configuration of an apparatus on a user equipment side in a wireless communication system according to the third embodiment of the present disclosure.

Figure 12:
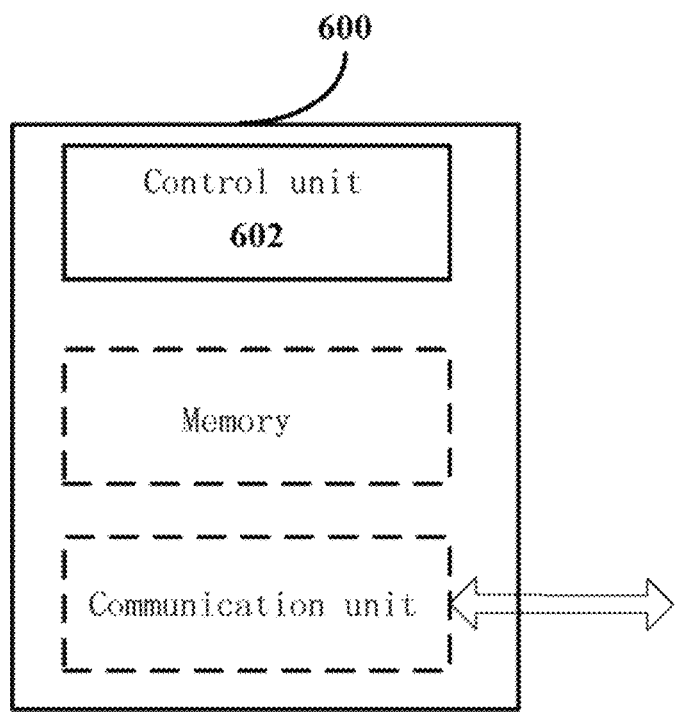
FIG. 12 is a block diagram showing an example of functional configuration of an apparatus on a user equipment side in a wireless communication system according to the third embodiment of the present disclosure.

As shown in FIG. 12, an apparatus 600 according to this embodiment may include a control unit 602.

The control unit 602 may be configured to: determine an uplink transmission angle according to information related to the uplink transmission angle from a base station; and control, based on the uplink transmission angle, user equipment to perform uplink transmission with respect to the base station.

Specifically, the information related to the uplink transmission angle may be determined by the base station based on the measurement result of the downlink channel quality. The information may be the downlink transmission beam determined by the base station by performing, for example, the downlink transmission beam scanning process, or may be a corresponding uplink transmission angle calculated by the base station based on the determined downlink transmission beam. In this way, the control unit 602 may directly acquire the uplink transmission angle based on the information from the base station or calculate the uplink transmission angle by performing the process described with reference to FIG. 9, and then controls the user equipment to perform uplink transmission based on the uplink transmission angle.

Alternatively, the information related to the uplink transmission angle may be an instruction for adjusting the uplink transmission angle made by the base station based on the measurement result of the uplink channel quality, so that the control unit 602 on the user equipment side may adjust, based on the instruction from the base station, the uplink transmission angle by, for example, adjusting a posture of the control unit 602, and transmits, utilizing the adjusted uplink transmission angle, an uplink reference signal to the base station on the uplink resource allocated by the base station. In a case that the base station determines that the measurement result of the uplink channel quality satisfies the predetermined condition and it is unnecessary to adjust the uplink transmission angle, the control unit 602 may control the user equipment to transmit, utilizing a finally adjusted uplink transmission angle, uplink data to the base station on a corresponding time-frequency resource.

It should be noted that the configuration example on the user equipment side described herein corresponds to the above configuration example on the base station side. Therefore, details that are not described here may refer to the corresponding description in the above, and are not repeated here.

In addition, it should be noted that the adjustment and the determination of the uplink transmission angle described in this embodiment may be combined with that in the first and second embodiments, so that the mapping relationship between the three-dimensional spatial regions and the uplink transmission angles can be established. In this way, in the subsequent communication process, the base station can directly instruct the user equipment to adjust the uplink transmission angle according to the spatial region where the user equipment is located, so as to reduce the system delay.

According to the third embodiment, through assisting, by the base station, the unmanned aerial vehicle in adjusting the uplink transmission angle, an effect similar to the beamforming can be achieved without increasing the processing load and power consumption of the unmanned aerial vehicle, thereby improving the uplink transmission quality.

4. Fourth Embodiment (Uplink Power Control

Compared to LTE communication on the ground, a channel condition, a channel model and the like in unmanned aerial vehicle communication change significantly. Therefore, if uplink power control is performed the unmanned aerial vehicle communication still based on configuration in the conventional LTE communication, problems such as increased interference and decreased communication quality may be caused, resulting in decrease in communication performance of an entire system. Since the unmanned aerial vehicle mainly transmits an uplink reference signal (SRS) and uplink data (that is, PUSCH) in uplink communication, the uplink power control discussed here is mainly for the SRS and the PUSCH. Configuration of an uplink path loss compensation factor and an uplink power correction value in the uplink power control for the unmanned aerial vehicle communication is described in this embodiment.

4-1. Configuration Example on a Base Station Side

Figure 13:
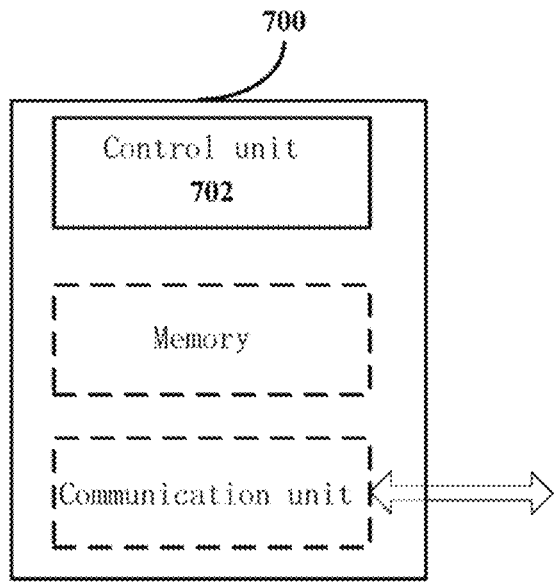
FIG. 13 is a block diagram showing an example of functional configuration of an apparatus on a base station side in a wireless communication system according to a fourth embodiment of the present disclosure.

FIG. 13 is a block diagram showing an example of functional configuration of an apparatus on a base station side in a wireless communication system according to the fourth embodiment of the present disclosure.

As shown in FIG. 13, an apparatus 700 according to this embodiment may include a control unit 702.

The control unit 702 may be configured to: determine, based on a measurement result for an uplink reference signal from user equipment, an uplink path loss compensation factor specific to the user equipment from a predetermined path loss compensation factor set, and/or an uplink power correction value specific to the user equipment from a predetermined power correction value set; and control a base station to notify the user equipment of the determined uplink path loss compensation factor and/or uplink power correction value, for the user equipment to perform uplink transmission (including transmission of the SRS and transmission of data information on PUSCH).

Configuration of the uplink path loss compensation factor and the uplink power correction value is described in detail below.

4-1-1. Configuration of an Uplink Path Loss Compensation Factor α

When performing uplink power control, the base station may calculate uplink path loss by measuring the SRS, and configures the path loss compensation factor α based on the calculated path loss. The path loss compensation factor α determines a weight of path loss compensation in uplink power control on the user equipment. In an uplink power control process of conventional LTE communication, the base station selects a to-be-configured path loss compensation factor α from a predetermined path loss compensation factor set {0, 0.4, 0.5, 0.6, 0.7, 0.8, 0.9, 1} based on the measured uplink path loss. This parameter is cell-specific, that is, all user equipment in the cell utilize the same path loss compensation factor α.

However, in this embodiment, in order to enhance the uplink power control for unmanned aerial vehicle communication, a dedicated uplink path loss compensation factor is configured for each user equipment. That is, in this embodiment, the configured uplink path loss compensation factor is UE-specific. As a configuration example, a parameter may be newly defined in uplink power control signaling (UplinkPowerControlIE) of an RRC layer to indicate that the configured uplink path loss compensation factor is UE-specific. The parameter is as follows:

Alpha-UE-r16::=ENUMERATED {al0, al04, al05, al06, al07, al08, al09, al1}

This parameter indicates that the UE-specific path loss compensation factor α is selected from the set {al0, al04, al05, al06, al07, al08, al09, al1}. In which al0, al04, al05, al06, al07, al08, al09 and al1 represent 0, 0.4, 0.5, 0.6, 0.7, 0.8, 0.9, and 1, respectively. This set may be referred to as a first path loss compensation factor set, and a value therein may be indicated by 3 bits.

Further, the unmanned aerial vehicle generally has higher flying height and faster flying speeds than the common UE on the ground. Therefore, in order to achieve more precise control, a second path loss compensation factor set having a finer adjustment granularity may be configured for unmanned aerial vehicle communication, compared with the conventional first path loss compensation factor set having a coarse adjustment granularity.

In an exemplary implementation, the uplink path loss compensation factor may be indicated by more bits, so that the uplink path loss compensation factor from 0 to 1 may be more finely divided. As an example, when the uplink path loss compensation factor is indicated by 4 bits (including 16 values), the parameter representing the UE-specific uplink path loss compensation factor in the above uplink power control signaling (UplinkPowerControlIE) may be modified as follows:

Alpha-UE-r15::=ENUMERATED {al0, al0625, al1250, al1875, al2500, al3125, al3750, al4375, al5000, al5625, al6250, al6875, al7500, al8125, al8750, al1}

This parameter indicates that the UE-specific path loss compensation factor α is selected from the set {al0, al0625, al1250, al1875, al2500, al3125, al3750, al4375, al5000, al5625, al6250, al6875, al7500, al8125, al8750, al1}. In which al0, al0625, al1250, al1875, al2500, al3125, al3750, al4375, al5000, al5625, al6250, al6875, al7500, al8125, al8750, and al1 represent 0, 0.0625, 0.125, 0.1875, 0.25, 0.3125, 0.375, 0.4375, 0.5, 0.5625, 0.625, 0.6875, 0.75, 0.8125, 0.875, and 1, respectively. This set may correspond to the second path loss compensation factor set described above.

It can be seen that compared to the first path loss compensation factor set, each parameter value in the second path loss compensation factor set is indicated by more bits, which has a finer adjustment granularity, thereby facilitating enhancement of uplink power control in unmanned aerial vehicle communication.

It should be noted that the configuration of parameter value in the second path loss compensation factor set given above is only illustrative rather than restrictive. For example, the adjustment granularity may be further refined to increase the number of parameters in the set, and parameter values in the set may adjusted, which is not limited herein, as long as more accurate control of the uplink path loss compensation factor is achieved.

When being parked on the ground or flying at a low height (for example, a height relative to a base station), the unmanned aerial vehicle may be considered as conventional user equipment. Therefore, preferably, the control unit 702 may determine, based on other information related to the user equipment (including but not limited to at least one of height information, operation mode information, identity information and capability information of the user equipment), whether the uplink path loss compensation factor specific to the user equipment is determined from the conventional first path loss compensation factor set or the second path loss compensation factor set having a finer adjustment granularity.

For example, in a case that a current height of the user equipment is higher than or equal to a predetermined height threshold value, that an operation mode of the user equipment is a flying mode (that is, an operation mode of the unmanned aerial vehicle flying at a certain height in the air), that it is determined based on the identity information that the user equipment is an unmanned aerial vehicle and/or that it is determined based on the capability information that the user equipment has a capability of performing unmanned aerial vehicle communication, the second path loss compensation factor may be selected. An appropriate uplink path loss compensation factor is selected from this set and is configured for the user equipment based on the uplink path loss obtained through subsequent measurement. Otherwise, a cell-specific path loss compensation factor may be configured for the user equipment as for the conventional user equipment.

It should be noted that switch-on and switch-off the flying mode herein may be instructed by the base station based on the flying height of the user equipment, or may be actively switched by the user equipment based on a height of the user equipment, which is not limited herein. A process of configuring the uplink path loss compensation factor in a case that the base station instructs the unmanned aerial vehicle to switch on the flying mode is described below with reference to FIG. 14.

Figure 14:
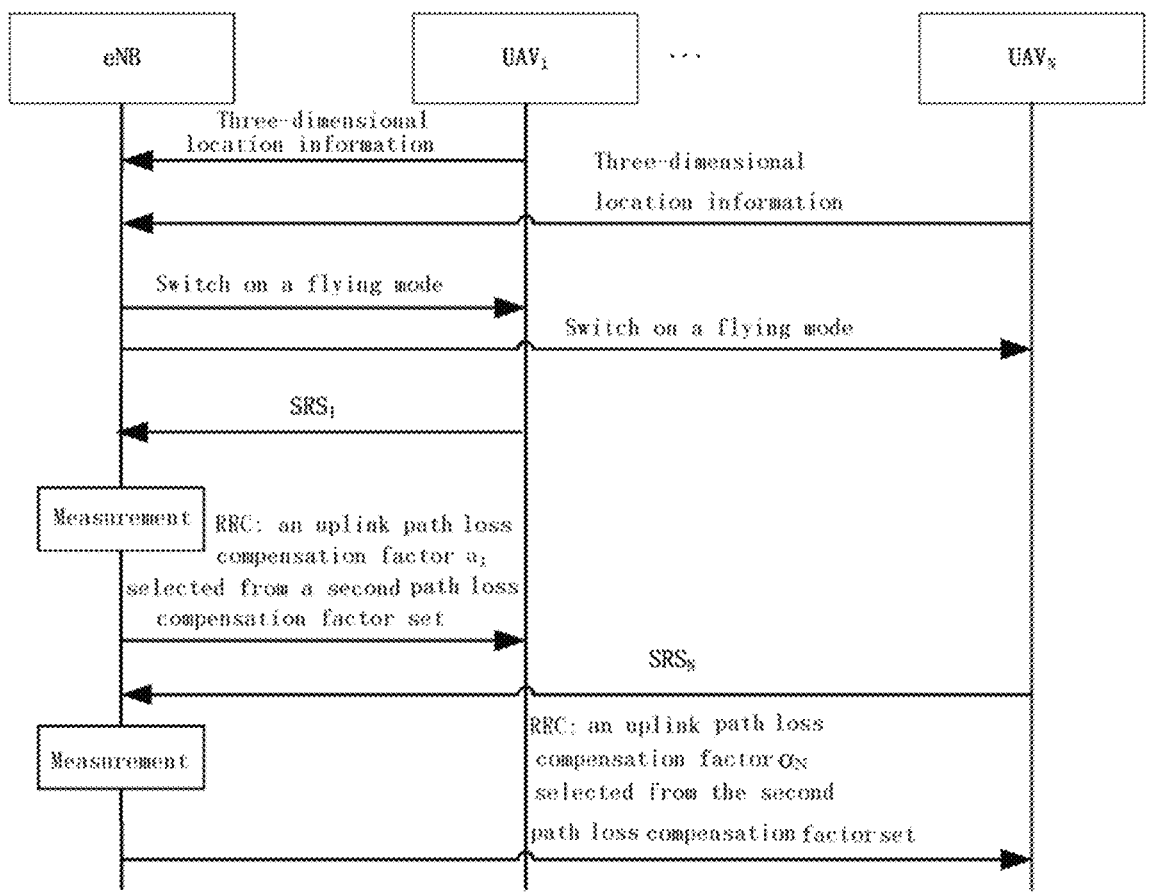
FIG. 14 is a flowchart showing an example of a signaling interaction process of configuring an uplink path loss compensation factor according to an embodiment of the present disclosure.

FIG. 14 is a flowchart showing an example of a signaling interaction process of configuring an uplink path loss compensation factor according to an embodiment of the present disclosure.

As shown in FIG. 14, a base station BS instructs, according to location information reported by unmanned aerial vehicles $UAV_1$ to $UAV_N$, the unmanned aerial vehicles $UAV_1$ to $UAV_N$ to switch on a flying mode, and determines to select the second path loss compensation factor set in this case. Then, the base station BS measures uplink reference signals $SRS_1$ to $SRS_N$ respectively transmitted by the unmanned aerial vehicles $UAV_1$ to $UAV_N$ to estimate uplink path loss, selects appropriate path loss compensation factors from the second path loss compensation factor set based on the estimated uplink path loss, and notifies the unmanned aerial vehicles $UAV_1$ to $UAV_N$ of selected path loss compensation factors $\alpha_1$ to $\alpha_N$ through the uplink power control signaling (UplinkPowerControlIE) of the RRC layer.

It should be noted that an example of selecting an appropriate uplink path loss compensation factor set based on operation mode information and configuring a dedicated uplink path loss compensation factor for the user equipment from the set is described with reference to FIG. 14. However, this example may be applicable to a case that the uplink path loss compensation factor is determined based on other information related to the user equipment (for example, the height information, the capability information, and the identity information), which is not described in detail herein.

4-1-2. Configuration of an Uplink Power Correction Value δ

The uplink power correction value δ is also referred to as a transmission power control command (TPC command), and is included in downlink control information (DCI) transmitted through the PDCCH. At present, correction of uplink power based on the TPC command includes two manners, namely, cumulative adjustment and absolute value adjustment.

The cumulative adjustment is applicable to PUSCH, PUCCH, and SRS. The absolute value adjustment is applicable to PUSCH only. Switchover between these two different adjustment manners is semi-static. The base station instructs, through a dedicated RRC signaling (UplinkPowerControlDedicated: accumulationEnabled), the user equipment to utilize the cumulative adjustment or the absolute value adjustment. The cumulative adjustment refers to that a current power adjustment value is obtained by adding an adjustment step indicated in the TPC to a former power adjustment value or subtracting an adjustment step indicated in the TPC from a former power adjustment value. The cumulative adjustment manner is a default adjustment manner utilized by the user equipment.

The absolute value adjustment manner refers to directly utilizing the power correction value indicated in the TPC, and is only applicable to the PUSCH. In this case, the base station is required to explicitly switch on the cumulative adjustment manner through the RRC signaling. In a case of absolute value adjustment manner, the power correction value included in the TPC includes (−4, −1, 1, 4) dB, which is indicated by DCI format 0/3 and has a power adjustment range up to 8 dB. The absolute value adjustment manner is suitable for uplink transmission of discontinuous user equipment, such that the base station can adjust the transmission power of the user equipment to a desired value in one step.

For ease of understanding, as an example, Table 3 shows a mapping relationship between bit information in the TPC command specified in the existing standard and the uplink power correction value for the PUSCH in the cumulative adjustment manner and the absolute value adjustment manner.

TABLE 3

| Field of TPC command in DCI format $0/0A/0_B/3/4/4A/4_B/6-0A/3_B$ | $\delta_{PUSCH,c}$ [dB] in cumulative adjustment manner | $\delta_{PUSCH,c}$ [dB] in absolute value adjustment manner, and only in DCI format $0/0A/0_B/4/4A/4_B/6-0A$ |
|---|---|---|
| 0 | −1 | −4 |
| 1 | 0 | −1 |
| 2 | 1 | 1 |
| 3 | 3 | 4 |

The set of values corresponding to the parameter $\delta_{PUSCH,c}$ (including the cumulative adjustment method and the absolute value adjustment method) in Table 3 may correspond to the "first power correction value set".

However, in the unmanned aerial vehicle communication, the unmanned aerial vehicle may have a high flying height and a fast flying speed. Therefore, an adjustment scale achieved based on the first power correction value set may be small, resulting in slow power adjustment speed. Further, power control requirements in the unmanned aerial vehicle communication cannot be satisfied.

In view of this, there is provided a solution for the unmanned aerial vehicle communication that the adjustment scale of the power correction value is increased to achieve faster power adjustment according to an embodiment of the present disclosure. As an exemplary implementation, the adjustment scale may be increased by increasing absolute values of correction values represented by bit information in the TPC command. That is, the power correction value in the second power correction value set for the unmanned aerial vehicle communication has a larger absolute value than the power correction value indicated by the same bit information in the first power correction value set in the conventional LTE communication. For ease of understanding, Table 4 shows a configuration example of the second power correction value set for the PUSCH.

TABLE 4

| Field of TPC command in DCI format $0/0A/0_B/3/4/4A/4_B/6-0A/3_B$ | $\delta_{PUSCH,c}$ [dB] in cumulative adjustment manner | $\delta_{PUSCH,c}$ [dB] in absolute value adjustment manner, and only in DCI format $0/0A/0_B/4/4A/4_B/6-0A$ |
|---|---|---|
| 0 | −2 | −5 |
| 1 | 0 | −3 |
| 2 | 2 | 3 |
| 3 | 5 | 5 |

It can be seen that compared to the uplink power correction value $\delta_{PUSCH,c}$ indicated by the same TPC command value in Table 3, the corresponding uplink power correction value $\delta_{PUSCH,c}$ in Table 4 has a larger absolute value, such that a larger-scale power adjustment can be achieved faster, so as to enhance uplink power control in the unmanned aerial vehicle communication. Further, for the absolute value adjustment manner, the power adjustment range (which is 10 dB in the example in Table 4) is increased.

It should be noted that the uplink power correction values shown in Table 4 are only illustrative rather than restrictive. In actual implementation, the uplink power correction values may be adjusted based on specific conditions, as long as fast power adjustment in the unmanned aerial vehicle communication is achieved Just.

In addition, it should be noted that although the embodiment of the present disclosure is described above in conjunction with Tables 3 and 4, taking the configuration of the uplink power correction value for PUSCH as an example, the above example may be applicable to configuration of the uplink power correction value for SRS.

Similar to the configuration of the uplink path loss compensation factor, preferably, the control unit 702 may determine, based on at least one of height information, operation mode information, identity information, and capability information of the user equipment, whether the uplink power correction value specific to the user equipment is determined from the first power correction value set or the second power correction value set. For example, in the case that a current height of the user equipment is higher than or equal to a predetermined height threshold value, that an operation mode of the user equipment is a flying mode (that is, an operation mode of the unmanned aerial vehicle flying at a certain height in the air), that it is determined based on the identity information that the user equipment is an unmanned aerial vehicle and/or that it is determined based on the capability information that the user equipment has a capability of performing unmanned aerial vehicle communication, the second power correction value set may be selected. An appropriate uplink power correction value is selected from this set and is configured for the user equipment based on a measurement result of the uplink reference signal from the user equipment. Otherwise, the first power correction value set is selected and an appropriate uplink power correction value is selected from this set and is configured for the user equipment as for the conventional user equipment.

As an example, a process of configuring an uplink power correction value in the case that the base station instructs the unmanned aerial vehicle to switch on the flying mode is described below with reference to FIG. 15.

Figure 15:
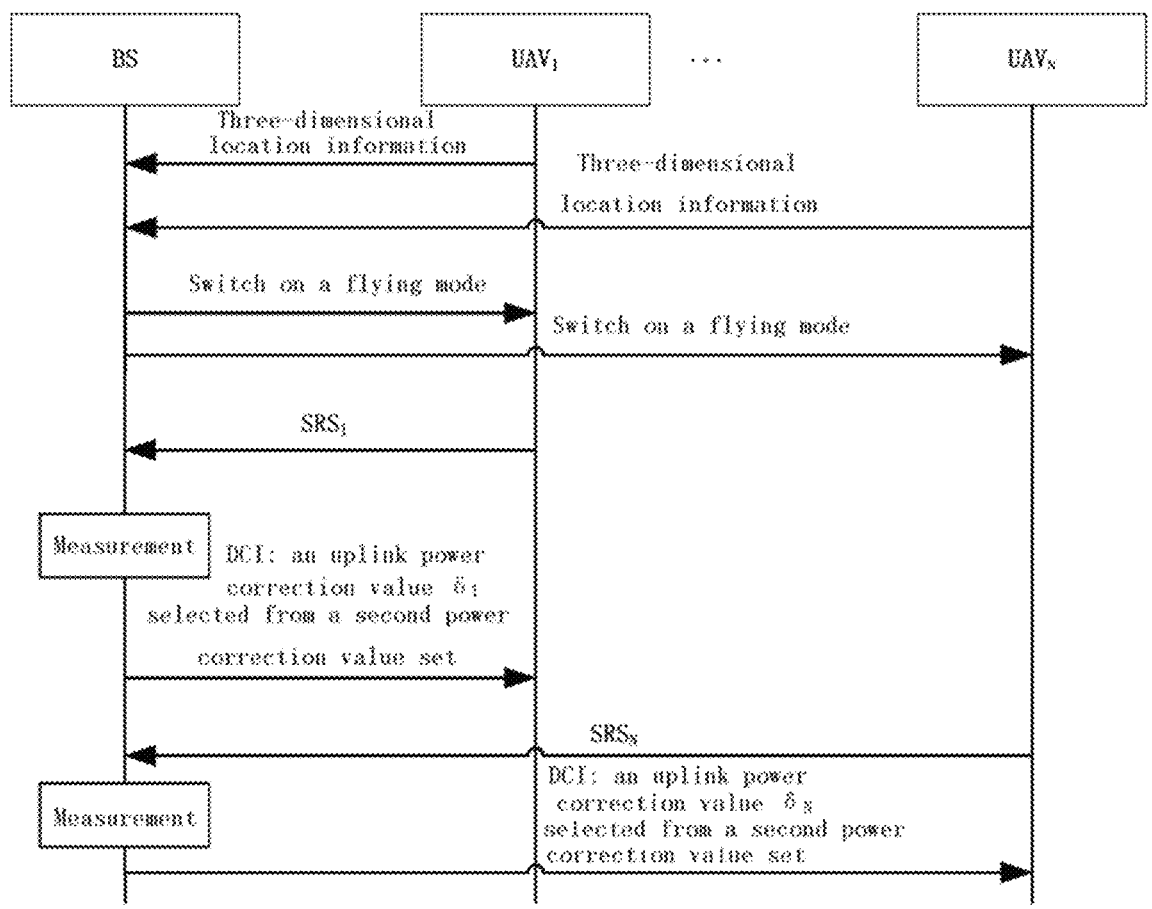
FIG. 15 is a flowchart showing an example of a signaling interaction process of configuring an uplink power correction value according to an embodiment of the present disclosure.

FIG. 15 is a flowchart showing an example of a signaling interaction process of determining an uplink power correction value according to an embodiment of the present disclosure.

As shown in FIG. 15, a base station BS instructs, according to location information reported by unmanned aerial vehicles $UAV_1$ to $UAV_N$, the unmanned aerial vehicles $UAV_1$ to $UAV_N$ to switch on a flying mode, and determines to select the second power correction value set in this case. Then, the base station BS measures uplink reference signals $SRS_1$ to $SRS_N$ respectively transmitted by the unmanned aerial vehicles $UAV_1$ to $UAV_N$, selects appropriate uplink power correction values from the second power correction value set based on the measurement result, and notifies the unmanned aerial vehicles $UAV_1$ to $UAV_N$ of selected uplink power correction values $\delta_1$ to $\delta_N$ through the field of TCP command in the DCI signaling of PDCCH.

It should be noted that the example of configuring the uplink power correction value based on the operation mode information is described with reference to FIG. 15. However, this example may be applicable to a case that the uplink power correction value is determined based on other information related to the user equipment. Details are not described herein.

Figure 16:
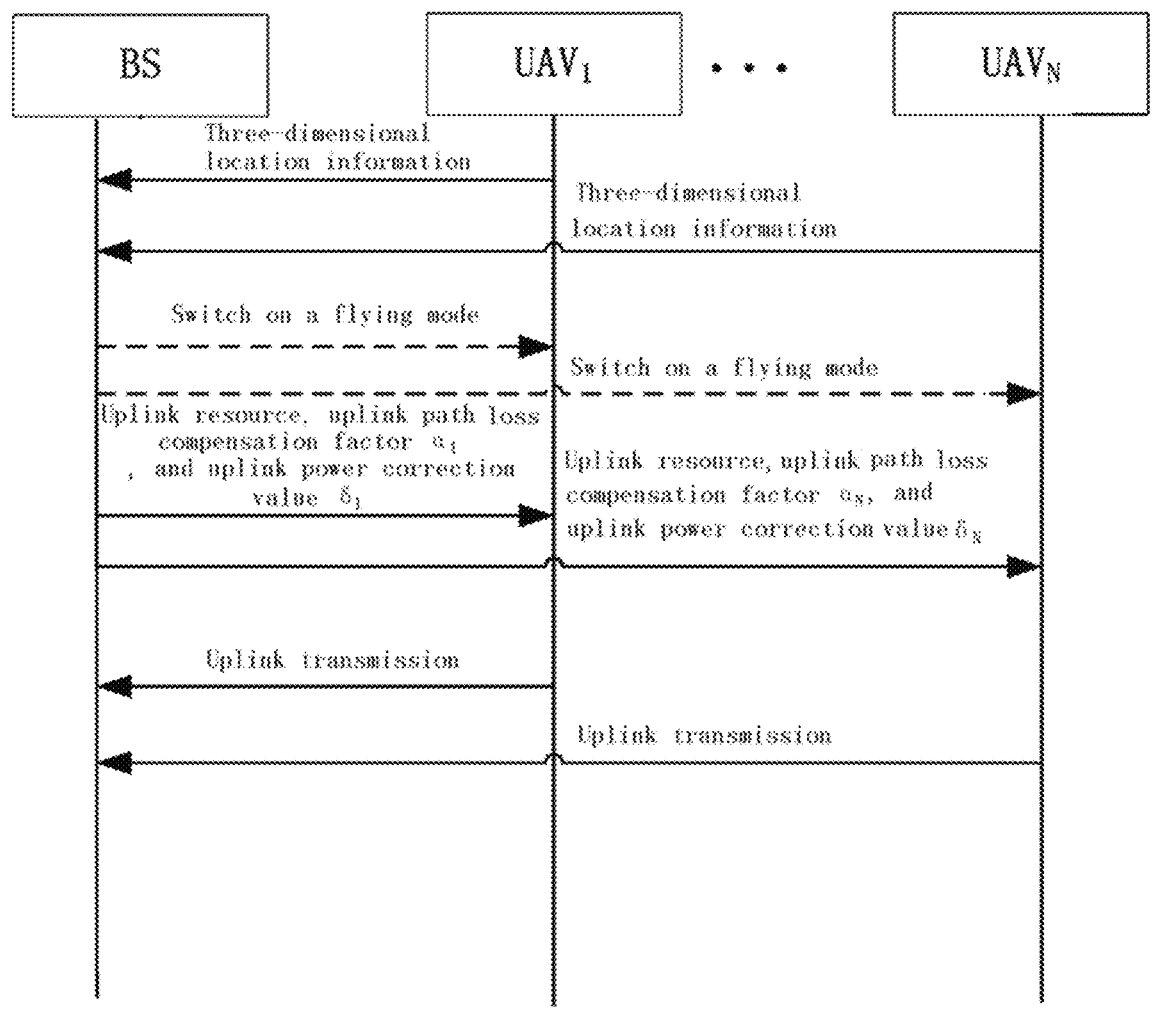
FIG. 16 is a flowchart showing an example of a signaling interaction process for determining an uplink path loss compensation factor and/or an uplink power correction value for user equipment according to the established mapping relationship.

It should further be noted that the configuration of the uplink path loss compensation factor and/or the uplink power correction value described in this embodiment may be combined with that in the first and second embodiments. That is, during the configuration process, three-dimensional spatial location information from the user equipment is received, and a mapping relationship between determined uplink path loss compensation factors as well as uplink power correction values and the three-dimensional spatial location information is established. In this way, during subsequent uplink transmission, the base station can directly allocate an uplink resource and a corresponding uplink power control parameter to the user equipment according to a three-dimensional spatial region where the user equipment is located, without performing conventional measurement, which can reduce the system delay. FIG. 16 is a flowchart showing an example of a signaling interaction process for determining an uplink path loss compensation factor and/or an uplink power correction value for user equipment according to the established mapping relationship.

As shown in FIG. 16, a base station BS instructs, according to three-dimensional location information reported by unmanned aerial vehicles $UAV_1$ to $UAV_N$, the unmanned aerial vehicles $UAV_1$ to $UAV_N$ to switch on a flying mode, allocates uplink resources to the unmanned aerial vehicles $UAV_1$ to $UAV_N$, and determines uplink path loss compensation factors $\alpha$ and uplink power correction values $\delta$ for the unmanned aerial vehicles $UAV_1$ to $UAV_N$. The unmanned aerial vehicles $UAV_1$ to $UAV_N$ perform, by utilizing the allocated uplink resources, uplink transmission to the base station BS based on uplink transmission power determined according to the uplink path loss compensation factors $\alpha$ and the uplink power correction values $\delta$, including transmitting uplink reference signals and uplink data.

It should be understood that the signaling interaction process shown in FIG. 16 is only an example, and may be appropriately modified by those skilled in the art based on the principles of the present disclosure. For example, a step of switching on the flying mode (represented by a dashed line in FIG. 16) shown in FIG. 16 may be omitted. An uplink path loss compensation factor $\alpha$ and an uplink power correction value $\delta$ can be allocated to the unmanned aerial vehicle according to a current location of the unmanned aerial vehicle and the stored mapping relationship. Details are not described herein.

4-2. Configuration Example on a User Equipment Side

Figure 17:
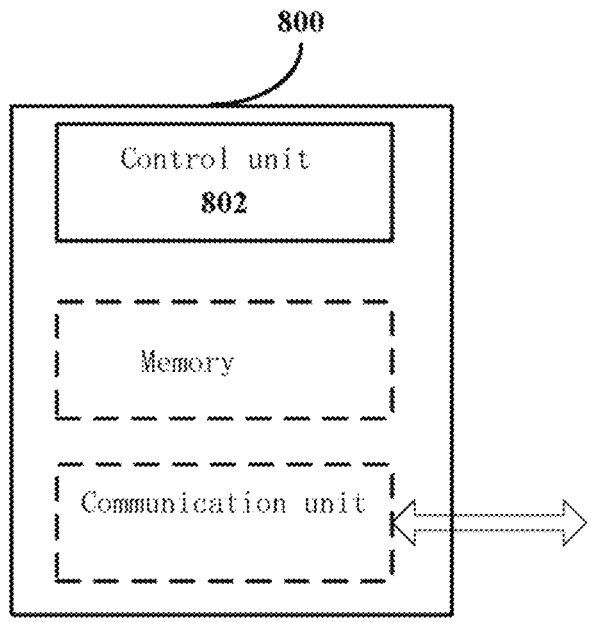
FIG. 17 is a block diagram showing an example of functional configuration of an apparatus on a user equipment side in a wireless communication system according to the fourth embodiment of the present disclosure.

Corresponding to the configuration example on the base station side, a configuration example on the user equipment side is described with reference to FIG. 17, which is a block diagram showing an example of functional configuration of an apparatus on a user equipment side in a wireless communication system according to the fourth embodiment of the present disclosure As shown in FIG. 17, an apparatus 800 according to this embodiment may include a control unit 802.

The control unit 802 may be configured to: control user equipment to transmit an uplink reference signal to a base station; and control, based on an uplink path loss compensation factor and/or an uplink power correction value specific to the user equipment notified by the base station, the user equipment to perform uplink data transmission or transmit the uplink reference signal with respect to the base station. The uplink path loss compensation factor and the uplink power correction value are respectively determined from a predetermined path loss compensation factor set and a predetermined power correction value set by the base station based on a measurement result for the uplink reference signal.

Preferably, the control unit 802 is further configured to control the user equipment to report other information related to the user equipment (including at least one of height information, operation mode information, identity information, and capability information of the user equipment) to the base station. The base station determines, based on the information, whether to select the conventional first path loss compensation factor set or the second path loss compensation factor set having a finer adjustment granularity as the predetermined path loss compensation factor set, and/or whether to select the conventional first power correction value set or the second power correction value set having a larger adjustment scale as the predetermined power correction value set.

A specific configuration process of the uplink path loss compensation factor and/or uplink power correction value may refer to the description in the configuration example on the base station side, and is not repeated herein.

It should be noted that the embodiment of the apparatus on the user equipment side in the fourth embodiment described here corresponds to the embodiment of the apparatus on the base station side in the fourth embodiment described above. Therefore, details that are not described here may refer to the corresponding description in the above, and are not repeated here.

According to the fourth embodiment of the present disclosure, based on characteristics of the unmanned aerial vehicle communication, through configuring an uplink path loss compensation factor $\alpha$ having a finer adjustment granularity and an uplink power correction value $\delta$ capable of achieving faster power adjustment compared with the existing configuration of the uplink power control parameter, uplink power control in the unmanned aerial vehicle communication can be enhanced and the communication performance can be optimized.

It should be noted that the apparatuses on the base station side in the third and fourth embodiments described with reference to FIGS. 11 and 13 may be implemented at the chip level, or may be implemented at the device level by including other external components. For example, the apparatus may function as a base station, and includes a communication unit (optionally, represented by a dashed box) for performing communication operations. The communication unit may include one or more communication interfaces to support communication with different devices. An implementation form of the communication unit is not limited herein. Preferably, the apparatus may further include a memory (optionally, represented by a dashed box).

In addition, it should be noted that the apparatuses on the user equipment side in the third and fourth embodiments described above with reference to FIGS. 12 and 17 may be implemented at the chip level, or may be implemented at the device level by including other external components. For example, the apparatus may function as the user equipment, and includes a communication unit (optionally, represented by a dashed box) for performing communication operations. The communication unit may include one or more communication interfaces to support communication with different devices. An implementation form of the communication unit is not limited herein. Preferably, the apparatus may further include a memory (optionally, represented by a dashed box).

In addition, it should further be noted that each functional unit in the apparatus in the embodiments described above is only a logical module based on a specific function the functional unit implements, and is not intended to limit the specific embodiment. In actual implementation, the functional units and modules may be implemented as independent physical entities, or may be implemented by a single entity (for example, a processor (such as a CPU or a DSP), or integrated circuitry).

It should further be noted that, although the embodiments of the apparatus according to the present disclosure are described above with reference to the block diagrams shown in the accompanying drawings, which is only illustrative rather than restrictive. Those skilled in the art may modify the functional configuration examples described based on the principles of the present disclosure. For example, addition, deletion, modification, combination or the like may be performed on the functional modules therein. All such variations should be considered as falling within the scope of the present disclosure.

Furthermore, it should be noted that although the configuration examples of the apparatus in the embodiments are separately described above for clarity of description, this does not indicate that the embodiments are mutually exclusive. In actual implementation, the embodiments may be combined based on the principles of the present disclosure, and such combination should be considered as falling within the scope of the present disclosure.

5. Embodiments of Method According to the Present Disclosure

Corresponding to the above embodiments of the apparatus, the following embodiments of method are further provided according to the present disclosure.

Figure 18:
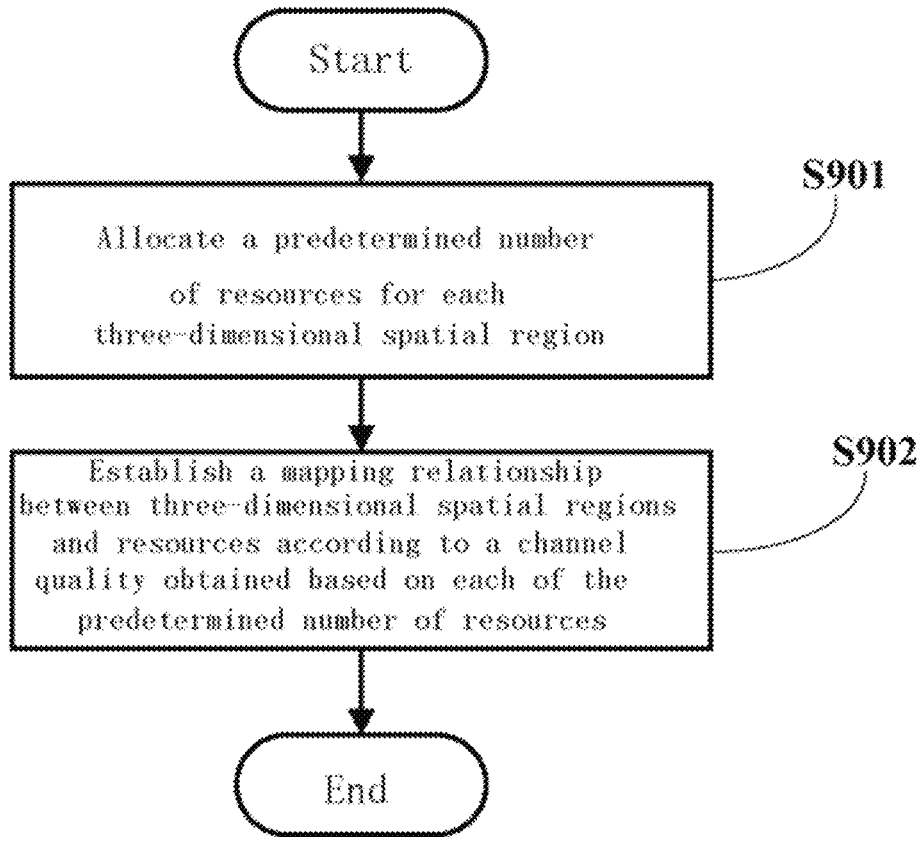
FIG. 18 is a flowchart showing an example of a method on the base station side in the wireless communication system according to the first embodiment of the present disclosure.

FIG. 18 is a flowchart showing an example of a method on the base station side in the wireless communication system according to the first embodiment of the present disclosure.

As shown in FIG. 18, the method according to this embodiment starts at step S901. In step S901, the base station allocates a predetermined number of resources for each three-dimensional spatial region.

Then, the method proceeds to step S902. In step S902, the base station establishes a mapping relationship between three-dimensional spatial regions and resources according to a channel quality obtained based on each of the predetermined number of resources.

Preferably, the mapping relationship may represent a mapping relationship between three-dimensional spatial regions and one or more of downlink resources, uplink resources, downlink transmission beams, and uplink power control parameters (including uplink path loss compensation factors and/or uplink power correction values) and the like.

Figure 19:
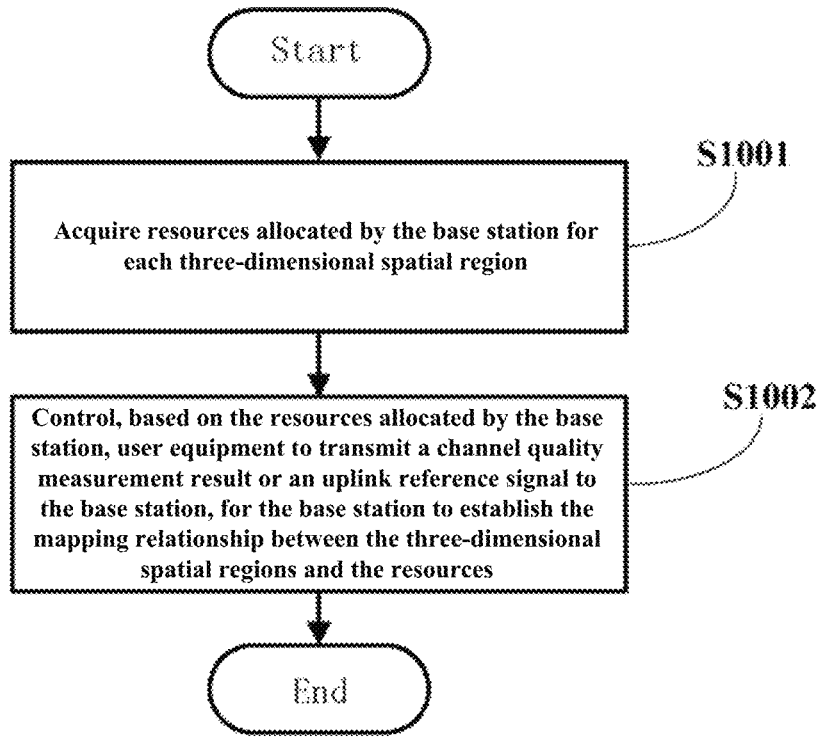
FIG. 19 is a flowchart showing an example of a method on the user equipment side in the wireless communication system according to the first embodiment of the present disclosure.

FIG. 19 is a flowchart showing an example of a method on the user equipment side in the wireless communication system according to the first embodiment of the present disclosure.

As shown in FIG. 19, the method starts at step S1001. In step S1001, resources allocated by the base station for each three-dimensional spatial region are acquired.

Then, the method proceeds to step S1002. In step S1002, based on the resources allocated by the base station, the user equipment is controlled to transmit a channel quality measurement result or an uplink reference signal to the base station, for the base station to establish the mapping relationship between the three-dimensional spatial regions and the resources.

Figure 20:
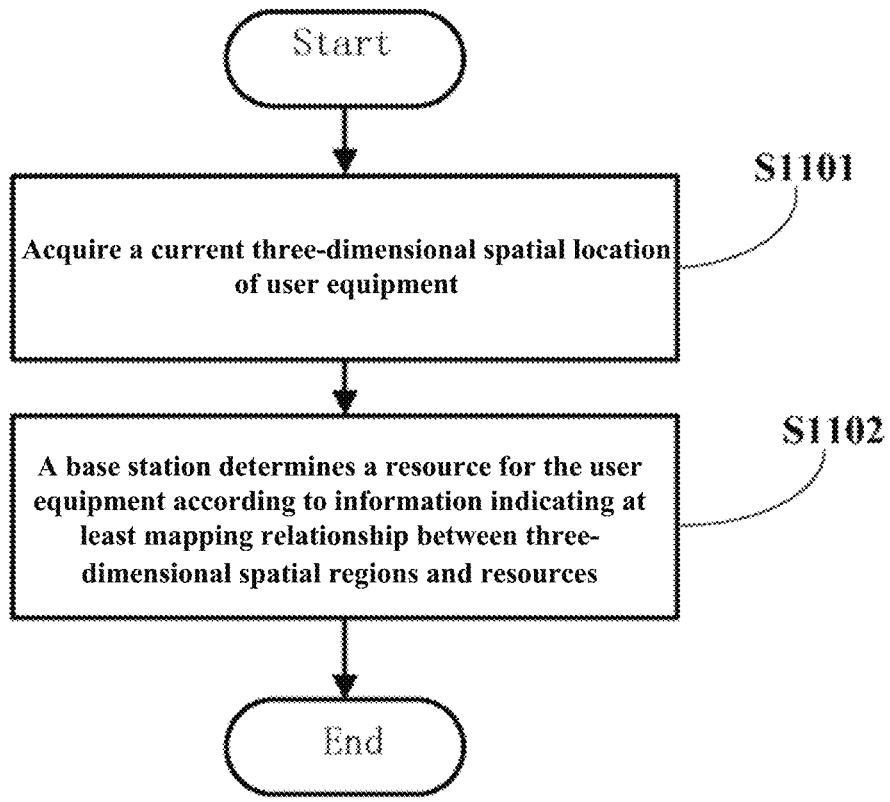
FIG. 20 is a flowchart showing an example of a method on the base station side in the wireless communication system according to the second embodiment of the present disclosure.

FIG. 20 is a flowchart showing an example of a method on the base station side in the wireless communication system according to the second embodiment of the present disclosure.

As shown in FIG. 20, the method according to this embodiment starts at step S1101. In step S1101, the base station acquires a current three-dimensional spatial location of the user equipment.

Then, the method proceeds to step S1102. In step S1102, the base station determines a resource for the user equipment according to information indicating at least mapping relationship between three-dimensional spatial regions and resources. The mapping relationship may be established by the method in the first embodiment, or may be established by other methods, which is not limited in this embodiment.

Figure 21:
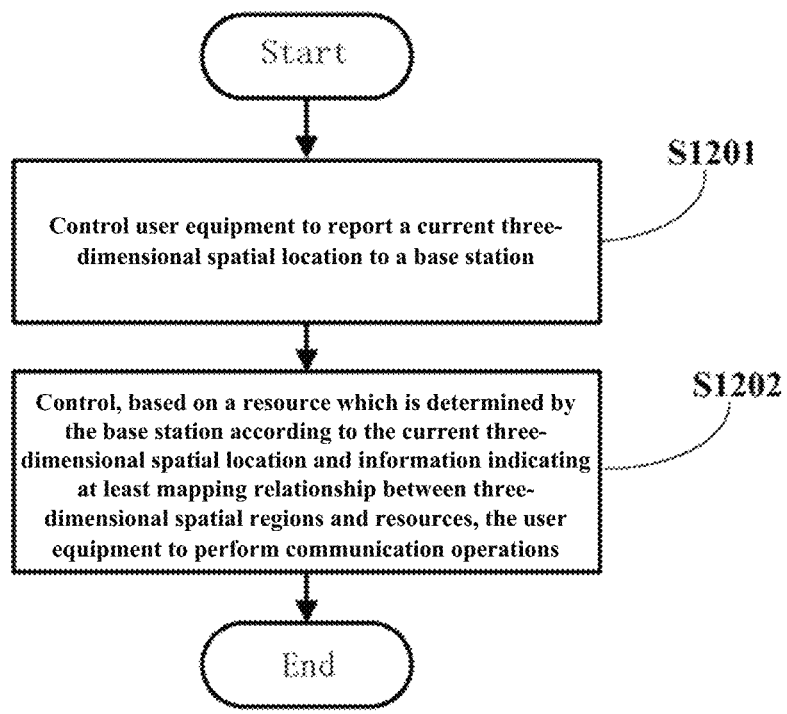
FIG. 21 is a flowchart showing an example of a method on the user equipment side in the wireless communication system according to the second embodiment of the present disclosure.

FIG. 21 is a flowchart showing an example of a method on the user equipment side in the wireless communication system according to the second embodiment of the present disclosure.

As shown in FIG. 21, the method starts at step S1201. In step S1201, the user equipment is controlled to report a current three-dimensional spatial location to a base station.

Then, the method proceeds to step S1202. In step S1202, the user equipment is controlled to perform communication operations based on a resource which is determined by the base station according to the current three-dimensional spatial location and information indicating at least mapping relationship between three-dimensional spatial regions and resources.

Figure 22:
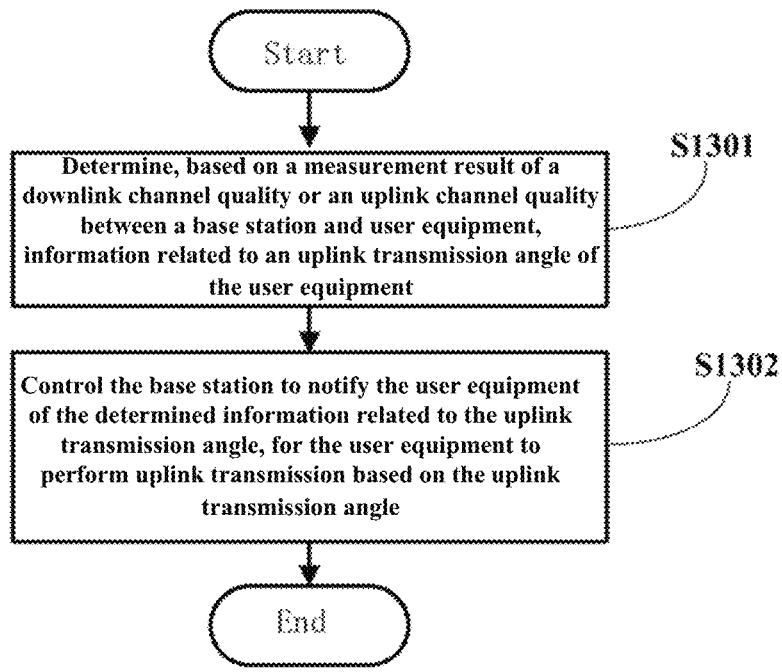
FIG. 22 is a flowchart showing an example of a method on the base station side in the wireless communication system according to the third embodiment of the present disclosure.

FIG. 22 is a flowchart showing an example of a method on the base station side in the wireless communication system according to the third embodiment of the present disclosure.

As shown in FIG. 22, the method according to this embodiment starts at step S1301. In step S1301, based on a measurement result of a downlink channel quality or an uplink channel quality between a base station and user equipment, information related to an uplink transmission angle of the user equipment is determined.

Then, the method proceeds to step S1302. In step S1302, the base station is controlled to notify the user equipment of the determined information related to the uplink transmission angle, for the user equipment to perform uplink transmission based on the uplink transmission angle.

Figure 23:
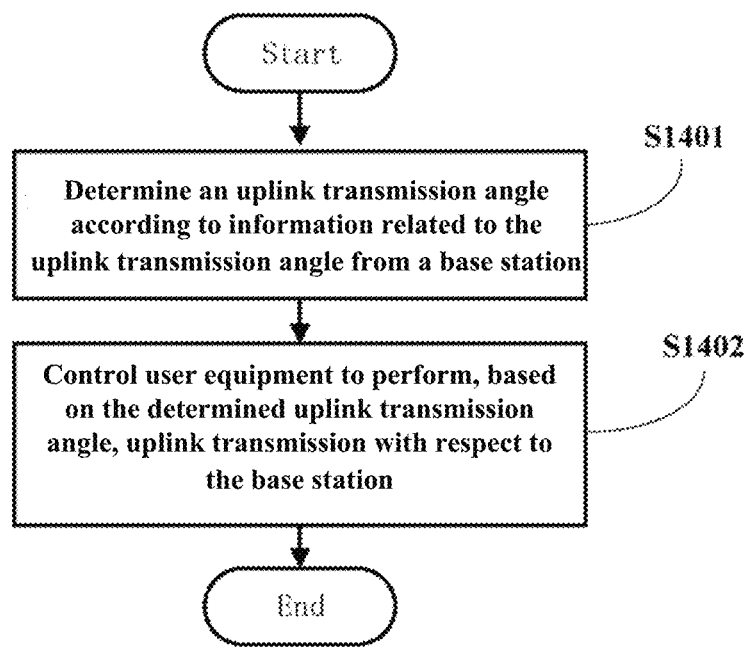
FIG. 23 is a flowchart showing an example of a method on the user equipment side in the wireless communication system according to the third embodiment of the present disclosure.

FIG. 23 is a flowchart showing an example of a method on the user equipment side in the wireless communication system according to the third embodiment of the present disclosure.

As shown in FIG. 23, the method starts at step S1401. In step S1401, an uplink transmission angle is determined according to information related to the uplink transmission angle from a base station.

Then, the method proceeds to step S1402. In step S1402, the user equipment is controlled to perform, based on the determined uplink transmission angle, uplink transmission with respect to the base station.

Figure 24:
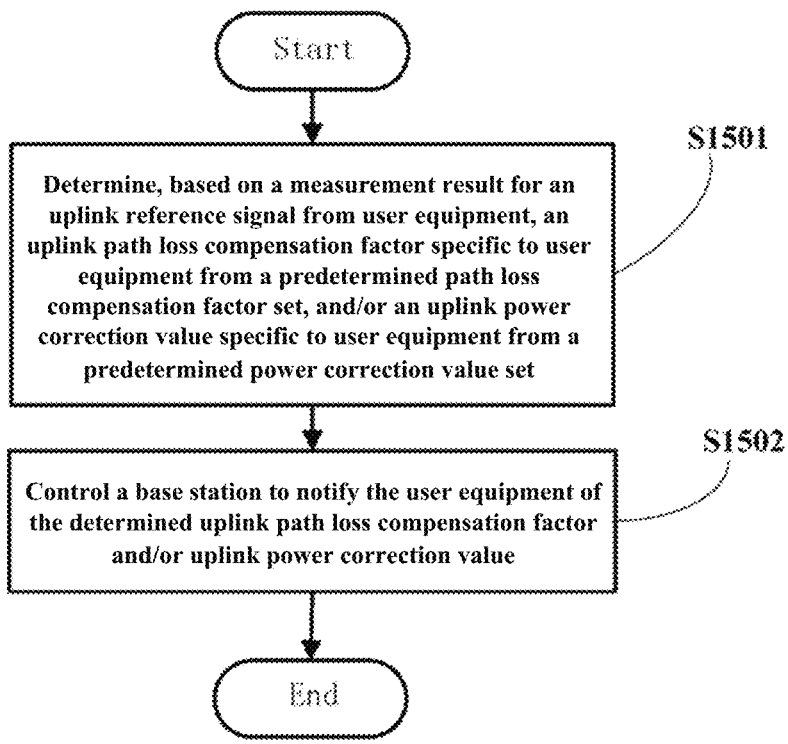
FIG. 24 is a flowchart showing an example of a method on the base station side in the wireless communication system according to the fourth embodiment of the present disclosure.

FIG. 24 is a flowchart showing an example of a method on the base station side in the wireless communication system according to the fourth embodiment of the present disclosure.

As shown in FIG. 24, the method according to this embodiment starts at step S1501. In step S1501, based on a measurement result for an uplink reference signal from user equipment, an uplink path loss compensation factor specific to the user equipment is determined from a predetermined path loss compensation factor set, and/or an uplink power correction value specific to the user equipment is determined from a predetermined power correction value set.

Then, the method proceeds to step S1502. In step S1502, a base station is controlled to notify the user equipment of the determined uplink path loss compensation factor and/or uplink power correction value.

Figure 25:
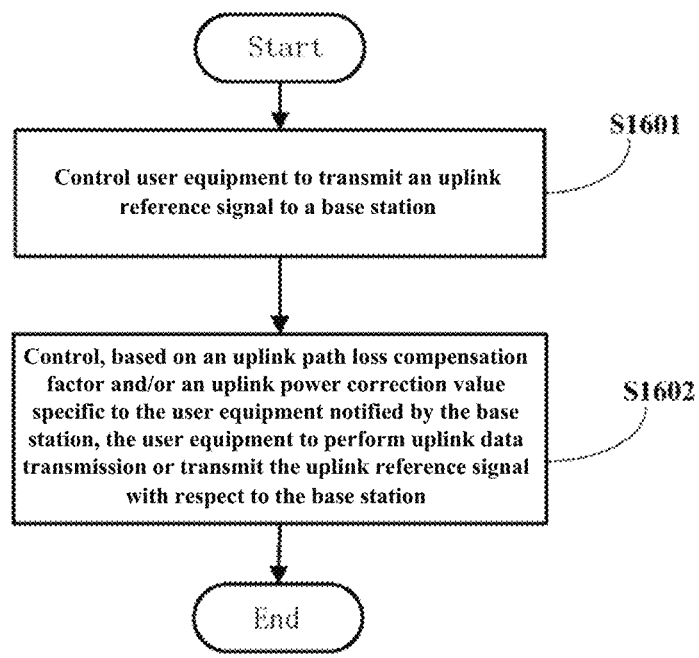
FIG. 25 is a flowchart showing an example of a method on the user equipment side in the wireless communication system according to the fourth embodiment of the present disclosure.

FIG. 25 is a flowchart showing an example of a method on the user equipment side in the wireless communication system according to the fourth embodiment of the present disclosure.

As shown in FIG. 25, the method starts at step S1601. In step S1601, the user equipment is controlled to transmit an uplink reference signal to a base station.

Then, the method proceeds to step S1602. In step S1602, based on an uplink path loss compensation factor and/or an uplink power correction value specific to the user equipment notified by the base station, the user equipment is controlled to perform uplink data transmission or transmit the uplink reference signal with respect to the base station. The uplink path loss compensation factor and the uplink power correction value are respectively determined from a predetermined path loss compensation factor set and a predetermined power correction value set by the base station based on a measurement result for the uplink reference signal.

It should be noted that the first to fourth embodiments of the method described here with reference to FIGS. 18 to 25 correspond to the first to fourth embodiments of the apparatus, respectively. Therefore, details that are not described here may refer to the corresponding description in the above, and are not repeated here.

It should further be noted that although embodiments of the method in a wireless communication system according to embodiments of the present disclosure are described above, these are only illustrative rather than restrictive. Those skilled in the art may modify the above embodiments based on the principles of the present disclosure, such as adding, deleting, or combining steps in the embodiments, and such modifications fall within the scope of the present disclosure.

Furthermore, it should be noted that although processes of the method in a wireless communication system according to embodiments of the present disclosure are described in an order of flowcharts in the drawings and the above description, a performing order of the method according to the present disclosure is not limited thereto. These processes may be performed in parallel or as needed.

Furthermore, an electronic device is further provided according to an embodiment of the present disclosure. The electronic device may include a transceiver and one or more processors. The one or more processors may be configured to perform the method in a wireless communication system or perform functions of corresponding units in the apparatus in a wireless communication system according to the embodiments of the present disclosure. The transceiver is configured to perform corresponding communication functions.

It should be understood that machine-executable instructions in a storage medium and a program product according to the embodiments of the present disclosure may be configured to perform the method corresponding to the above embodiments of the apparatus. Therefore, details that are not described here may refer to the corresponding description in the above, and are not repeated here.

Accordingly, a storage medium for carrying the above program product that stores machine-executable instructions is also included in the present disclosure. The storage medium includes but is not limited to a floppy disk, an optical disk, a magneto-optical disk, a memory card, a memory stick and the like.

Figure 26:
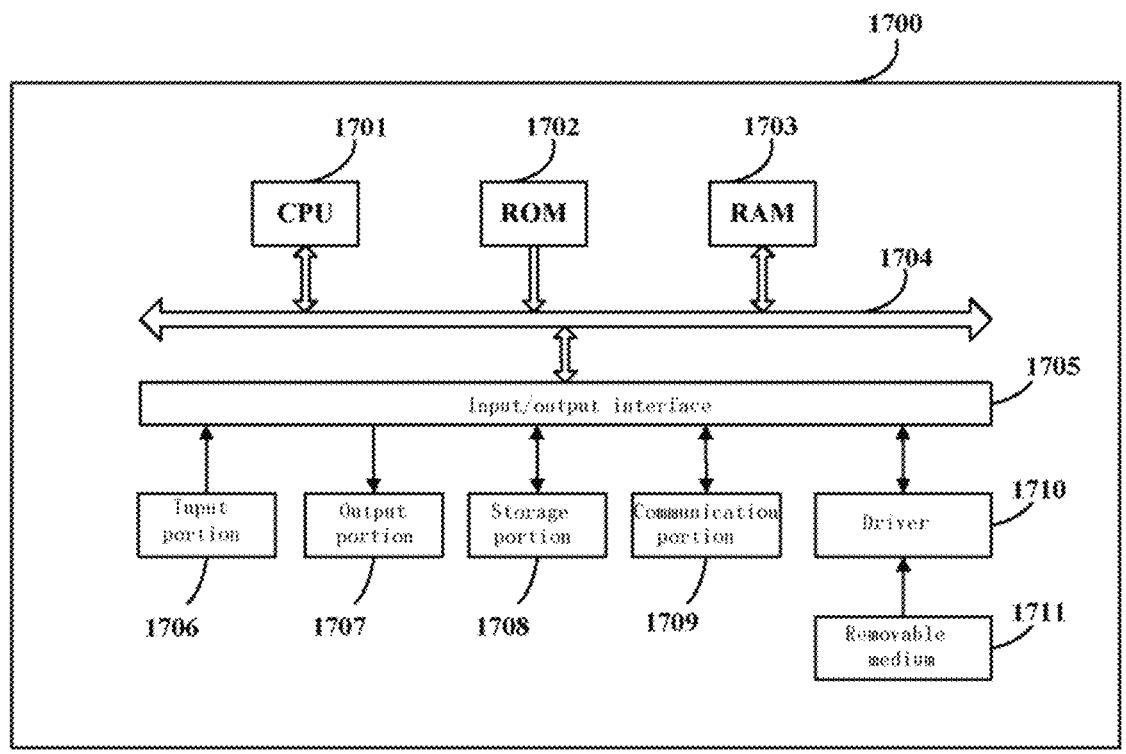
FIG. 26 is a block diagram showing an example structure of a personal computer as an information processing device applicable in embodiments of the present disclosure.

6. Computing Device for Implementing Embodiments of the Apparatus and the Method According to the Present Disclosure In addition, it should be noted that the above-described series of processing and apparatus may be implemented by software and/or firmware. In a case that the above-described series of processing and apparatus are implemented by software and/or firmware, a computer having a dedicated hardware structure, for example, a general-purpose personal computer 1700 shown in FIG. 26, is installed with a program constituting the software from a storage medium or a network. When being installed with various programs, the computer is capable of performing various functions. FIG. 26 is a block diagram showing an example structure of a personal computer as an information processing device applicable in embodiments of the present disclosure.

In FIG. 26, a central processing unit (CPU) 1701 performs various processing in accordance with a program stored in a read only memory (ROM) 1702 or a program loaded from a storage portion 1708 to a random-access memory (RAM) 1703. Data required for the various processing of the CPU 1701 may be stored in the RAM 1703 as needed.

The CPU 1701, the ROM 1702, and the RAM 1703 are connected to each other via a bus 1704. An input/output interface 1705 is also connected to the bus 1704.

The following components are connected to the input/output interface 1705: an input portion 1706 including a keyboard, a mouse or the like; an output portion 1707 including a display such as a cathode ray tube (CRT), a liquid crystal display (LCD), a loudspeaker or the like; a storage portion 1708 including a hard disk or the like; and a communication portion 1709 including a network interface card such as a LAN card, a modem or the like. The communication portion 1709 performs communication processing via a network such as the Internet.

A driver 1710 may also be connected to the input/output interface 1705 as needed. A removable medium 1711 such as a magnetic disk, an optical disk, a magneto-optical disk, and a semiconductor memory may be installed on the driver 1710 as needed, so that a computer program read from the removable medium 1711 is installed into the storage portion 1708 as needed.

In a case that the above series of processing are implemented by software, a program constituting the software is installed from a network such as the Internet, or a storage medium such as the removable medium 1711.

Those skilled in the art should understand that the storage medium is not limited to the removable medium 1711 shown in FIG. 26 that stores a program and is distributed separately from the device so as to provide the program to the user. The removable medium 1711, for example, may include a magnetic disk (including a floppy disk (registered trademark)), an optical disk (including a compact disk read only memory (CD-ROM) and a digital versatile disc (DVD)), a magneto-optical disk (including a minidisc (MD) (registered trademark)), and a semiconductor memory. Alternatively, the storage medium may be the ROM 1702, a hard disk included in the storage portion 1708 or the like. The storage medium has a program stored therein and is distributed to the user together with a device in which the storage medium is included.

7. Application Example of Technology According to the Present Disclosure

The technology according to the present disclosure is applicable to various products. For example, the base station described herein may be implemented as any type eNB (such as a macro eNB and a small eNB). The small eNB may cover an eNB of a cell smaller than a macro cell, such as a pico eNB, a micro eNB and a home (femto) eNB. Alternatively, the base station may be implemented as any other type of base station, such as a NodeB and a base transceiver station (BTS). The base station may include: a main body (also referred to as a base station device) configured to control wireless communication; and one or more remote radio heads (RRH) located at locations different from the main body. In addition, various types of terminals each may operate as a base station by temporarily or semi-persistently performing functions of the base station.

Application examples according to the present disclosure are described below with reference to FIGS. 27 to 28.

First Application Example

Figure 27:
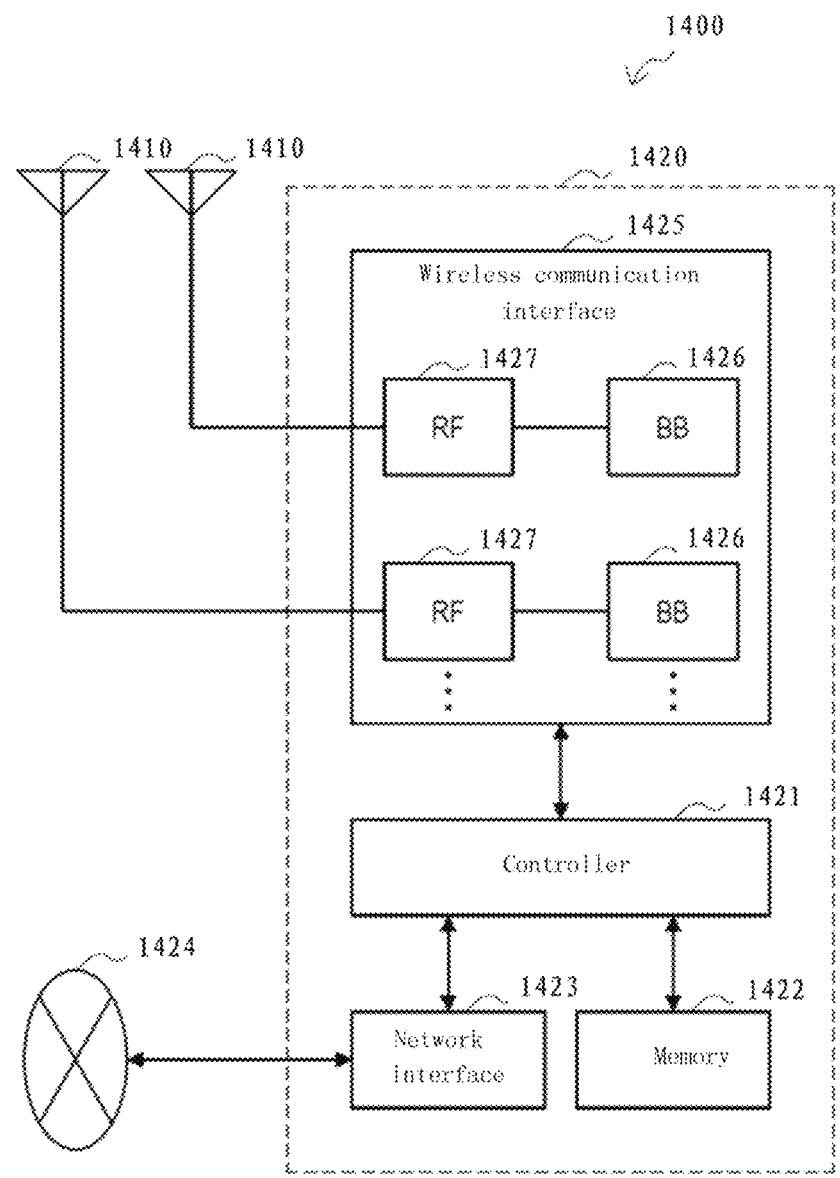
FIG. 27 is a block diagram showing a first example of configuration of an evolved node (eNB) to which technology according to the present disclosure is applicable.

FIG. 27 is a block diagram showing a first example of configuration of an evolved node (eNB) to which technology according to the present disclosure is applicable. An eNB 1400 includes one or more antennas 1410 and a base station device 1420. Each antenna 1410 is connected to the base station device 1420 via an RF cable.

Each of the antennas 1410 includes one or more antenna elements (such as multiple antenna elements included in a multiple-input multiple-output (MIMO) antenna), and is utilized for the base station device 1420 to transmit and receive a wireless signal. As shown in FIG. 27, the eNB 1400 may include multiple antennas 1410. For example, the multiple antennas 1410 may be compatible with multiple frequency bands utilized by the eNB 1400. Although FIG. 27 shows an example in which the eNB 1400 includes multiple antennas 1410, the eNB 1400 may include one antenna 1410.

The base station device 1420 includes a controller 1421, a memory 1422, a network interface 1423, and a wireless communication interface 1425.

The controller 1421 may be, for example, a CPU or a DSP, and performs various functions of a high layer of the base station device 1420. For example, the controller 1421 generates a packet based on data in a signal processed by the wireless communication interface 1425, and transmits the generated packet via the network interface 1423. The controller 1421 may bundle data from multiple baseband processors to generate a bundled packet, and transmits the generated bundled packet. The controller 1421 may have a logical function that performs control such as radio resource control, radio bearer control, mobility management, admission control, and scheduling. This control may be performed in conjunction with a nearby eNB or core network node. The memory 1422 includes a RAM and a ROM, and stores a program executed by the controller 1421 and various types of control data (such as a terminal list, transmission power data, and scheduling data).

The network interface 1423 is a communication interface via which the base station device 1420 is connected to a core network 1424. The controller 1421 may communicate with a core network node or another eNB via the network interface 1423. In this case, the eNB 1400 may be connected to the core network node or other eNBs via a logical interface (such as an S1 interface and an X2 interface). The network interface 1423 may also be a wired communication interface or a wireless communication interface for a wireless backhaul line. If the network interface 1423 is a wireless communication interface, the network interface 1423 may utilize a higher frequency band for wireless communication, compared with a frequency band utilized by the wireless communication interface 1425.

The wireless communication interface 1425 supports any cellular communication scheme (such as long-term evolution (LTE), LTE-Advanced (LTE-A)), and provides a wireless connection to a terminal located in a cell of the eNB 1400 via the antenna 1410. The wireless communication interface 1425 may generally include, for example, a baseband (BB), a processor 1426 and an RF circuitry 1427. The BB processor 1426 may perform, for example, encoding/decoding, modulation/demodulation, and multiplexing/de-multiplexing, and performs various types of signal processing of a layer (for example, L1, medium access control (MAC), radio link control (RLC), and packet data convergence protocol (PDCP)). Instead of the controller 1421, the BB processor 1426 may have a part or all of the above logical functions. The BB processor 1426 may be a memory storing a communication control program or a module including a processor and related circuitry that are configured to execute a program. The function of the BB processor 1426 may be changed by updating the program. The module may be a card or a blade inserted into a slot of the base station device 1420. Alternatively, the module may be a chip mounted on a card or a blade. Further, the RF circuitry 1427 may include, for example, a mixer, a filter, and an amplifier, and transmits and receives a wireless signal via the antenna 1410.

As shown in FIG. 27, the wireless communication interface 1425 may include multiple BB processors 1426. For example, the multiple BB processors 1426 may be compatible with multiple frequency bands utilized by the eNB 1400. As shown in FIG. 27, the wireless communication interface 1425 may include multiple RF circuitry 1427. For example, the multiple RF circuitry 1427 may be compatible with multiple antenna elements. Although FIG. 27 shows an example in which the wireless communication interface 1425 includes multiple BB processors 1426 and multiple of RF circuitry 1427, the wireless communication interface 1425 may also include one BB processor 1426 or one RF circuitry 1427.

Second Application Example

Figure 28:
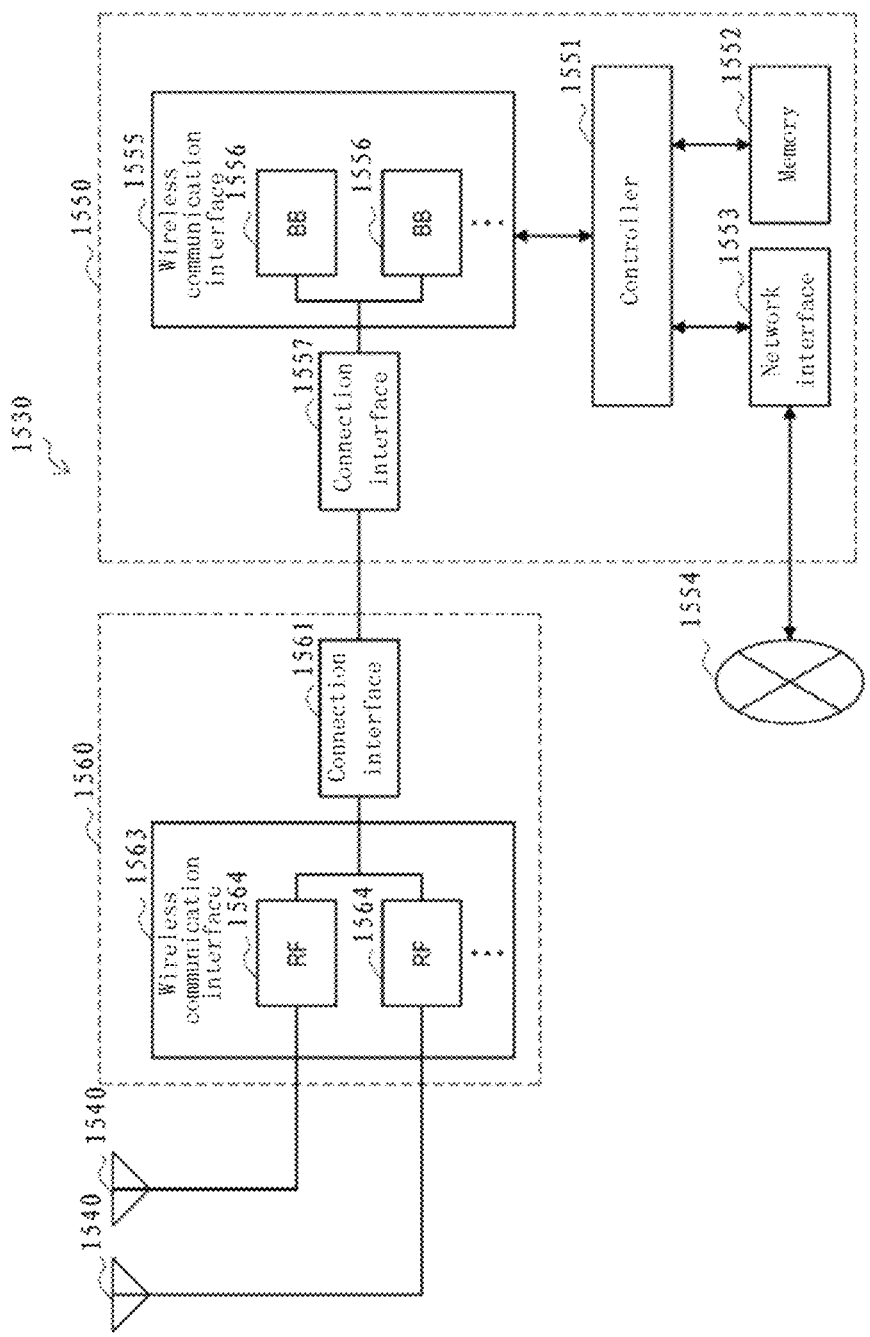
FIG. 28 is a block diagram showing a second example of configuration of an eNB to which the technology according to the present disclosure is applicable.

FIG. 28 is a block diagram showing a second example of configuration of an eNB to which the technology according to the present disclosure is applicable. An eNB 1530 includes one or more antennas 1540, a base station device 1550, and an RRH 1560. Each antenna 1540 may be connected to the RRH 1560 and via an RF cable. The base station equipment 1550 may be connected to the RRH 1560 via a high-speed line such as a fiber optic cable.

Each of the antennas 1540 includes one or more antenna elements (such as multiple antenna elements included in a MIMO antenna), and is utilized for the RRH 1560 to transmit and receive a wireless signal. As shown in FIG. 28, the eNB 1530 may include multiple antennas 1540. For example, the multiple antennas 1540 may be compatible with multiple frequency bands utilized by the eNB 1530. Although FIG. 28 shows an example in which the eNB 1530 includes multiple antennas 1540, the eNB 1530 may include one antenna 1540.

The base station device 1550 includes a controller 1551, a memory 1552, a network interface 1553, a wireless communication interface 1555, and a connection interface 1557. The controller 1551, the memory 1552, and the network interface 1553 are respectively identical to the controller 1421, the memory 1422, and the network interface 1423 described with reference to FIG. 27.

The wireless communication interface 1555 supports any cellular communication scheme (such as LTE, LTE-Advanced), and provides wireless communication to a terminal located in a sector corresponding to the RRH 1560 via the RRH 1560 and the antenna 1540. The wireless communication interface 1555 may generally include, for example, a BB processor 1556. The BB processor 1556 is identical to the BB processor 1426 described with reference to FIG. 27 except that the BB processor 1556 is connected to the RF circuitry 1564 of the RRH 1560 via the connection interface 1557. As shown in FIG. 28, the wireless communication interface 1555 may include multiple BB processors 1556. For example, the multiple BB processors 1556 may be compatible with multiple frequency bands utilized by the eNB 1530. Although FIG. 28 shows an example in which the wireless communication interface 1555 includes multiple BB processors 1556, the wireless communication interface 1555 may include one BB processor 1556.

The connection interface 1557 is an interface via which the base station device 1550 (wireless communication interface 1555) is connected to the RRH 1560. Alternatively, the connection interface 1557 may be a communication module for communication in the high-speed line via which the base station device 1550 (wireless communication interface 1555) is connected to the RRH 1560.

The RRH 1560 includes a connection interface 1561 and a wireless communication interface 1563.

The connection interface 1561 is an interface via which the RRH 1560 (wireless communication interface 1563) is connected to the base station device 1550. Alternatively, the connection interface 1561 may be a communication module for communication in the high-speed line.

The wireless communication interface 1563 transmits and receives a wireless signal via the antenna 1540. The wireless communication interface 1563 may generally include, for example, an RF circuitry 1564. The RF circuitry 1564 may include, for example, a mixer, a filter, and an amplifier, and transmits and receives a wireless signal via the antenna 1540. As shown in FIG. 28, the wireless communication interface 1563 may include multiple RF circuitry 1564. For example, the multiple RF circuitry 1564 may support multiple antenna elements. Although FIG. 28 shows an example in which the wireless communication interface 1563 includes multiple RF circuitry 1564, the wireless communication interface 1563 may include one RF circuitry 1564.

In the eNB 1400 and the eNB 1530 respectively shown in FIG. 27 and FIG. 28, the communication unit in the apparatus on the base station side may be implemented by the wireless communication interface 1425 and the wireless communication interface 1555 and/or the wireless communication interface 1563. At least a part of the functions of the control unit in the apparatus on the base station side may be implemented by the controller 1421 and the controller 1551.

Preferred embodiments of the present disclosure are described above with reference to the accompanying drawings, but the present disclosure is not limited thereto. Those skilled in the art may make various alternations and modifications within the scope of the appended claims, and it should be understood that these alternations and modifications naturally fall within the technical scope of the present disclosure.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. This configuration is undoubtedly included in the technical scope of the present disclosure.

In this specification, steps described in the flowchart include not only processing performed in time series in the described order, but also processing performed in parallel or individually instead of having to be performed in time series. Further, even in the steps processed in time series, the order may be appropriately changed.

Although the present disclosure and advantages of the present disclosure are described in detail, it should be understood that various changes, substitutions and alterations may be made hereto without departing from the spirit and scope of the present disclosure as defined by the appended claims. Furthermore, terms "including", "comprising", or any other variation thereof in the embodiments of the present disclosure are intended to encompass non-exclusive inclusion, such that the process, method, article, or device that includes a series of elements includes not only those elements, but also other elements not listed herein, or elements inherent in the process, method, article, or device. In addition, without more restrictions, the elements defined by an expression "including a . . . " do not exclude that other identical elements exist in the process, method, article, or device that includes the elements.

Additionally, the present technology may also be configured.

Solution 1. An apparatus in a wireless communication system, the apparatus comprising processing circuitry configured to:
  acquire a current three-dimensional spatial location of user equipment; and
  determine a resource for the user equipment according to information indicating at least mapping relationship between three-dimensional spatial regions and resources.

Solution 2. The apparatus according to solution 1, wherein the information further indicates mapping relationship between the three-dimensional spatial regions and downlink resources, and the processing circuitry is further configured to: determine a downlink resource for the user equipment according to the information, and control a base station to perform downlink transmission with respect to the user equipment by utilizing the determined downlink resource.

Solution 3. The apparatus according to solution 1 or 2, wherein the information further indicates mapping relationship between the three-dimensional spatial regions and downlink transmission beams, and the processing circuitry is further configured to: determine a downlink transmission beam for the user equipment according to the information, and control a base station to perform downlink transmission with respect to the user equipment by utilizing the determined downlink transmission beam.

Solution 4. The apparatus according to solution 3, wherein the processing circuitry is further configured to: control the base station to notify the user equipment of information related to the determined downlink transmission beam, for the user equipment to perform uplink transmission with respect to the base station based on the downlink transmission beam.

Solution 5. The apparatus according to solution 4, wherein the processing circuitry is further configured to:
  determine an uplink transmission angle of the user equipment with respect to the base station according to the determined downlink transmission beam; and
  control the base station to notify the user equipment of the determined uplink transmission angle, for the user equipment to perform uplink transmission based on the uplink transmission angle.

Solution 6. The apparatus according to solution 1, wherein the information further indicates mapping relationship between the three-dimensional spatial regions and uplink resources, and the processing circuitry is further configured to: determine an uplink resource for the user equipment according to the information, and allocate the determined uplink resource to the user equipment, for the user equipment to perform uplink transmission and/or device to device communication.

Solution 7. The apparatus according to solution 1 or 6, wherein the information further indicates mapping relationship between the three-dimensional spatial regions and uplink path loss compensation factors and/or uplink power correction values.

Solution 8. The apparatus according to solution 7, wherein the processing circuitry is further configured to:
  determine an uplink path loss compensation factor and/or an uplink power correction value for the user equipment according to the information and the current three-dimensional spatial location; and control a base station to notify the user equipment of the determined plink path loss compensation factor and/or uplink power correction value.

Solution 9. The apparatus according to solution 7, wherein the processing circuitry is further configured to: control a base station to transmit the information to the user equipment, for the user equipment to determine an uplink path loss compensation factor and/or an uplink power correction value corresponding to the current three-dimensional spatial location.

Solution 10. The apparatus according to solution 1, wherein the apparatus operates as a base station and further comprises: a communication unit configured to perform communication operations.

Solution 11. An apparatus in a wireless communication system, the apparatus comprising processing circuitry configured to:
  control user equipment to report a current three-dimensional spatial location to a base station; and
  control, based on a resource which is determined by the base station according to the current three-dimensional spatial location and information indicating at least mapping relationship between three-dimensional spatial regions and resources, the user equipment to perform communication operations.

Solution 12. The apparatus according to solution 11, wherein the information further indicates mapping relationship between the three-dimensional spatial regions and downlink resources, and the processing circuitry is further configured to: control, based on a downlink resource corresponding to the current three-dimensional spatial location determined by the base station, the user equipment to perform downlink data reception.

Solution 13. The apparatus according to solution 11 or 12, wherein the information further indicates mapping relationship between the three-dimensional spatial regions and downlink transmission beams, and the processing circuitry is further configured to: control, according to information related to a determined downlink transmission beam notified by the base station, the user equipment to perform uplink transmission with respect to the base station based on the downlink transmission beam.

Solution 14. The apparatus according to solution 13, wherein the processing circuitry is further configured to:
  determine an uplink transmission angle of the user equipment with respect to the base station according to the information related to the determined downlink transmission beam from the base station; and control the user equipment to perform uplink transmission with respect to the base station based on the uplink transmission angle.

Solution 15. The apparatus according to solution 13, wherein the processing circuitry is further configured to: control, by adjusting a posture of the user equipment, the user equipment to perform uplink transmission with respect to the base station based on the downlink transmission beam.

Solution 16. The apparatus according to solution 11, wherein the information further indicates mapping relationship between the three-dimensional spatial regions and uplink resources, and the processing circuitry is further configured to: control, based on an uplink resource corresponding to the current three-dimensional spatial location determined by the base station, the user equipment to perform uplink transmission with respect to the base station and/or to perform device to device communication with respect to another device.

Solution 17. The apparatus according to solution 11 or 16, wherein the information further indicates mapping relationship between the three-dimensional spatial regions and uplink path loss compensation factors and/or uplink power correction values.

Solution 18. The apparatus according to solution 17, wherein the processing circuitry is further configured to: control, based on an uplink path loss compensation factor and/or an uplink power correction value corresponding to the current three-dimensional spatial location determined by the base station, the user equipment to perform uplink data transmission or transmit a sounding reference signal with respect to the base station.

Solution 19. The apparatus according to solution 17, wherein the processing circuitry is further configured to:
  determine, according to the information from the base station, an uplink path loss compensation factor and/or an uplink power correction value corresponding to the current three-dimensional spatial location; and control, based on the determined uplink path loss compensation factor and/or uplink power correction value, the user equipment to perform uplink data transmission or transmit a sounding reference signal with respect to the base station.

Solution 20. The apparatus according to solution 11, wherein the apparatus operates as the user equipment and further comprises: a communication unit configured to perform communication operations.

Solution 21. An apparatus in a wireless communication system, the apparatus comprising processing circuitry configured to:
- allocate a predetermined number of resources for each three-dimensional spatial region; and
- establish, according to a channel quality obtained based on each of the predetermined number of resources, mapping relationship between three-dimensional spatial regions and resources.

Solution 22. The apparatus according to solution 21, wherein the processing circuitry is further configured to:
- control, for each three-dimensional spatial region, a base station to transmit a downlink reference signal to one or more user equipment by utilizing each of a predetermined number of downlink resources;
- determine, according to measurement results of downlink channel qualities fed back by the one or more user equipment based on the received downlink reference signal, a downlink resource for each three-dimensional spatial region among the predetermined number of downlink resources; and
- establish, based on the downlink resource determined for each three-dimensional spatial region, mapping relationship between the three-dimensional spatial regions and the downlink resources.

Solution 23. The apparatus according to solution 22, wherein the processing circuitry is further configured to:
- control, for each three-dimensional spatial region, the base station to transmit a downlink reference signal to the one or more user equipment by utilizing each of a predetermined number of downlink transmission beams;
- determine, according to measurement results of downlink channel qualities fed back by the one or more user equipment based on the received downlink reference signal, a downlink transmission beam for each three-dimensional spatial region among the predetermined number of downlink transmission beams; and
- establish, based on the downlink transmission beam determined for each three-dimensional spatial region, mapping relationship between the three-dimensional spatial regions and the downlink transmission beams.

Solution 24. The apparatus according to solution 23, wherein the determined downlink transmission beam is represented by information indicative of an azimuth angle and a downlink transmission power.

Solution 25. The apparatus according to solution 23, wherein the processing circuitry is further configured to:
- store the established mapping relationship in a form of a table in which the three-dimensional spatial regions, the downlink resources and the downlink transmission beams are associated with one another.

Solution 26. The apparatus according to solution 22, wherein the predetermined number is an integral multiple of 8.

Solution 27. The apparatus according to solution 21, wherein the processing circuitry is further configured to:
- allocate, for each three-dimensional spatial region, a predetermined number of uplink resources to one or more user equipment;
- perform uplink channel quality measurement based on uplink reference signals transmitted by the one or more user equipment utilizing each of the predetermined number of uplink resources;
- determine, according to a result of the uplink channel quality measurement, an uplink resource for each three-dimensional spatial region among the predetermined number of uplink resources; and
- establish, based on the uplink resource determined for each three-dimensional spatial region, mapping relationship between the three-dimensional spatial regions and the uplink resources.

Solution 28. The apparatus according to solution 27, wherein the processing circuitry is further configured to:
- determine an uplink path loss compensation factor and/or an uplink power correction value for each three-dimensional spatial region; and
- establish, based on the uplink path loss compensation factor and/or the uplink power correction value determined for each three-dimensional spatial region, mapping relationship between the three-dimensional spatial regions and uplink path loss compensation factors and/or uplink power correction values.

Solution 29. The apparatus according to solution 28, wherein the processing circuitry is further configured to:
- store the established mapping relationship in a form of a table in which the three-dimensional spatial regions, the uplink resources and the uplink path loss compensation factors and/or uplink power correction values are associated with one another.

Solution 30. The apparatus according to solution 21, wherein the processing circuitry is further configured to:
- store the established mapping relationship in a form of a table in which the three-dimensional spatial regions and the resources are associated with each other.

Solution 31. The apparatus according to solution 30, wherein the processing circuitry is further configured to: update the table according to a predetermined condition.

Solution 32. The apparatus according to solution 30, wherein the processing circuitry is further configured to: update the table according to information interaction with another base station.

Solution 33. The apparatus according to any one of solutions 21 to 32, wherein the apparatus operates as a base station and further comprises: a communication unit configured to perform communication operations.

Solution 34. An apparatus in a wireless communication system, the apparatus comprising processing circuitry configured to:
- control, based on a predetermined number of resources allocated by a base station for each three-dimensional spatial region, user equipment to transmit to the base station a channel quality measurement result and/or an uplink reference signal, for the base station to establish mapping relationship between three-dimensional spatial regions and resources.

Solution 35. An apparatus in a wireless communication system, the apparatus comprising processing circuitry configured to:
- determine, based on a measurement result of a downlink channel quality or an uplink channel quality between a base station and user equipment, information related to an uplink transmission angle of the user equipment; and
- control the base station to notify the user equipment of the determined information related to the uplink transmission angle, for the user equipment to perform uplink transmission based on the uplink transmission angle.

Solution 36. The apparatus according to solution 35, wherein the processing circuitry is further configured to:
- control the base station to transmit a downlink reference signal to the user equipment by utilizing each of a predetermined number of downlink transmission beams;

determine, according to measurement results of downlink channel qualities fed back by the user equipment based on the received downlink reference signal, a downlink transmission beam for the user equipment among the predetermined number of downlink transmission beams; and control the base station to notify information related to the determined downlink transmission beam to the user equipment.

Solution 37. The apparatus according to solution 36, wherein the processing circuitry is further configured to:
determine the uplink transmission angle based on the determined downlink transmission beam; and
control the base station to notify the determined uplink transmission angle to the user equipment.

Solution 38. The apparatus according to solution 35, wherein the processing circuitry is further configured to:
allocate an uplink resource to the user equipment; and
perform uplink channel quality measurement based on an uplink reference signal transmitted by the user equipment utilizing the uplink resource; and
instruct, according to a result of the uplink channel quality measurement, the user equipment to adjust the uplink transmission angle and re-allocate an uplink resource to the user equipment, until the result of the uplink channel quality measurement satisfies a predetermined condition.

Solution 39. An apparatus in a wireless communication system, the apparatus comprising processing circuitry configured to:
determine an uplink transmission angle according to information related to the uplink transmission angle from a base station; and
control user equipment to perform, based on the uplink transmission angle, uplink transmission with respect to the base station.

Solution 40. The apparatus according to solution 39, wherein the information related to the uplink transmission angle is information related to a downlink transmission beam for the user equipment which is determined by the base station based on a measurement result of a downlink channel quality, and the processing circuitry is further configured to:
determine the uplink transmission angle of the user equipment with respect to the base station based on the information related to the downlink transmission beam; and
control the user equipment to perform uplink transmission based on the uplink transmission angle.

Solution 41. The apparatus according to solution 39, wherein the information related to the uplink transmission angle is an instruction to adjust the uplink transmission angle made by the base station based on a measurement result of an uplink channel quality, and the processing circuitry is further configured to:
adjust, based on the instruction from the base station, the uplink transmission angle of the user equipment, and control the user equipment to transmit the uplink reference signal to the base station by utilizing the adjusted uplink transmission angle; and
control the user equipment to perform uplink transmission with respect to the base station by utilizing a final adjusted uplink transmission angle.

Solution 42. An apparatus in a wireless communication system, the apparatus comprising processing circuitry configured to:

determine, based on a measurement result for an uplink reference signal from user equipment, an uplink path loss compensation factor specific to the user equipment from a predetermined path loss compensation factor set, and/or an uplink power correction value specific to the user equipment from a predetermined power correction value set; and
control a base station to notify the user equipment of the determined uplink path loss compensation factor and/or uplink power correction value.

Solution 43. The apparatus according to solution 42, wherein the processing circuitry is further configured to:
select, further based on other information related to the user equipment, the predetermined path loss compensation factor set from a first path loss compensation factor set and a second path loss compensation factor set, and/or the predetermined power correction value set from a first power correction value set and a second power correction value set.

Solution 44. The apparatus according to solution 43, wherein the second path loss compensation factor set has a finer adjustment granularity than the first path loss compensation factor set, and the second power correction value set has a larger adjustment scale than the first power correction value set.

Solution 45. The apparatus according to solution 44, wherein path loss compensation factors in the second path loss compensation factor set are denoted by more bits than path loss compensation factors in the first path loss compensation factor set, and a power correction value in the second power correction value set has a larger absolute value than a power correction value, which is denoted by same bit information as the power correction value in the second power correction value set, in the first power correction value set.

Solution 46. The apparatus according to solution 43, wherein the other information related to the user equipment comprises at least one of height information, operation mode information, identity information and capability information of the user equipment.

Solution 47. The apparatus according to solution 46, wherein the processing circuitry is further configured to:
in a case that a current height of the user equipment is higher than or equal to a predetermined height threshold value, that an operation mode of the user equipment is a flying mode, that the user equipment is an unmanned aerial vehicle and/or that the user equipment has a capability of performing unmanned aerial vehicle communication, select the second path loss compensation factor set as the predetermined path loss compensation factor set, and/or select the second power correction value set as the predetermined power correction value set.

Solution 48. An apparatus in a wireless communication system, the apparatus comprising processing circuitry configured to:
control user equipment to transmit an uplink reference signal to a base station; and
control, based on an uplink path loss compensation factor and/or an uplink power correction value specific to the user equipment notified by the base station, the user equipment to perform uplink data transmission or transmit the uplink reference signal with respect to the base station,
wherein the uplink path loss compensation factor and the uplink power correction value are respectively determined from a predetermined path loss compensation factor set and a predetermined power correction value set by the base station based on a measurement result for the uplink reference signal.

Solution 49. A method in a wireless communication system, the method being performed by the processing circuitry in the apparatus according to any one of solutions 1 to 48.

Solution 50. A computer readable storage medium storing a program which, when being executed by a computer, causes the computer to perform the method according to solution 49.

The invention claimed is:

1. An apparatus operating as a base station in a wireless communication system, the apparatus comprising processing circuitry configured to:
   acquire three-dimensional spatial location information of one or more communication devices located in a three-dimensional geographical area;
   establish one or more static three-dimensional regions in the three-dimensional geographical area at least based on the acquired three-dimensional spatial location information; and
   allocate at least one region-specific communication resource for each of the one or more static three-dimensional regions.

2. The apparatus according to claim 1, wherein the processing circuitry is further configured to establish the one or more three-dimensional regions further based on at least one radio characteristic of a communication link between the apparatus and the one or more communication devices communicating within the one or more three-dimensional regions.

3. The apparatus according to claim 2, wherein the acquired three-dimensional spatial location information of the one or more communication devices comprises:
   information about a location of the one or more communication devices in the three-dimensional geographical area; and
   downlink reference signal measurement information related to one or more downlink reference signals transmitted by the apparatus and detected by the one or more communication devices at the location.

4. The apparatus according claim 3, wherein the processing circuitry is further configured to store information about the allocated at least one region-specific communication resource in a memory, and to communicate with a new communication device by:
   obtaining a location of the new communication device within the three-dimensional geographical area;
   assigning a communication resource to the new communication device based on the correspondence between the location of the new communication device within the three-dimensional geographical area and the stored information about the allocated at least one region-specific communication resource; and
   communicating with the new communication device based on the assigned communication resource.

5. The apparatus according to claim 4,
   wherein, based on the downlink reference signal measurement information, the at least one region-specific communication resource comprise at least one of an uplink path loss compensation factor or an uplink power correction value;
   wherein the communication resource is assigned to the new communication device without performing an uplink resource allocation and measurement with the new communication device and comprises an uplink transmission angle and an uplink power control parameter to be used by the new communication device, the assigned uplink power control parameter being at least one of the uplink path loss compensation factor or the uplink power correction value that corresponds to the location of the new communication device within the three-dimensional geographical area,
   wherein the uplink transmission angle is used by the new communication device to adjust a posture so that an uplink from the new communication device to the apparatus matches the uplink transmission angle, and
   wherein the processing circuitry is further configured to receive the uplink from the new communication device in accordance with the assigned uplink power control parameter and the uplink transmission angle.

6. A method performed by an apparatus operating as a base station in a wireless communication system, the method comprising:
   acquiring three-dimensional spatial location information of one or more communication devices located in a three-dimensional geographical area;
   establishing one or more static three-dimensional regions in the three-dimensional geographical area at least based on the acquired three-dimensional spatial location information; and
   allocating at least one region-specific communication resource for each of the one or more static three-dimensional regions.

7. The method according to claim 6, wherein the one or more three-dimensional regions are established further based on at least one radio characteristic of a communication link between the apparatus and the one or more communication devices communicating within the one or more three-dimensional regions.

8. The method according to claim 7, wherein the acquired three-dimensional spatial location information of the one or more communication devices comprises:
   information about a location of the one or more communication devices in the three-dimensional geographical area; and
   downlink reference signal measurement information related to one or more downlink reference signals transmitted by the apparatus and detected by the one or more communication devices at the location.

9. The method according claim 8, further comprising:
   storing information about the allocated at least one region-specific communication resource in a memory, and
   communicating with a new communication device by:
      obtaining a location of the new communication device within the three-dimensional geographical area;
      assigning a communication resource to the new communication device based on the correspondence between the location of the new communication device within the three-dimensional geographical area and the stored information about the allocated at least one region-specific communication resource; and
      communicating with the new communication device based on the assigned communication resource.

10. The method according to claim 9,
   wherein, based on the downlink reference signal measurement information, the at least one region-specific communication resource comprise at least one of an uplink path loss compensation factor or an uplink power correction value;
   wherein the communication resource is assigned to the new communication device without performing an uplink resource allocation and measurement with the new communication device and comprises an uplink transmission angle and an uplink power control parameter to be used by the new communication device, the assigned uplink power control parameter being at least one of the uplink path loss compensation factor or the uplink power correction value that corresponds to the location of the new communication device within the three-dimensional geographical area, wherein the uplink transmission angle is used by the new communication device to adjust a posture so that an uplink from the new communication device to the apparatus matches the uplink transmission angle, and wherein the method further comprises receiving the uplink from the new communication device in accordance with the assigned uplink power control parameter and the uplink transmission angle.

11. A non-transitory computer readable product containing instructions to cause an apparatus operating as a base station in a wireless communication system to perform a method, the method comprising:

acquiring three-dimensional spatial location information of one or more communication devices located in a three-dimensional geographical area;

establishing one or more static three-dimensional regions in the three-dimensional geographical area at least based on the acquired three-dimensional spatial location information; and allocating at least one region-specific communication resource for each of the one or more static three-dimensional regions.

\* \* \* \* \*